Dec. 19, 1950 P. H. E. CLAESSON ET AL 2,534,500

AUTOMATIC SWITCHING ARRANGEMENT

Filed Dec. 30, 1947 15 Sheets-Sheet 1

INVENTORS:
PER HARRY ELIAS CLAESSON
IVAN WITALIS GRUNDIN
BY Richardson, David and Nordon
ATTYS INVENTORS:
PER HARRY ELIAS CLAESSON
IVAN WITALIS GRUNDIN
By Richardson, David and Nordon
ATTYS

| | | | | |
|---|---|---|---|---|
| 0 | + | | | |
| 1 | + | + | | |
| 2 | + | + | + | |
| 3 | − | + | | |
| 4 | − | + | − | + |
| 5 | + | − | + | |
| 6 | − | + | + | |
| 7 | + | + | − | + |
| 8 | − | + | + | + |
| 9 | + | − | + | + |

INVENTORS:
PER HARRY ELIAS CLAESSON
IVAN WITALIS GRUNDIN
By Richardson, David and Nordon
ATTYS INVENTORS:
PER HARRY ELIAS CLAESSON
IVAN WITALIS GRUNDIN
By Richardson, David and Nordon
ATTYS INVENTORS:
PER HARRY ELIAS CLAESSON
IVAN WITALIS GRUNDIN
By Richardson, David and Nordon
ATTY'S Dec. 19, 1950 P. H. E. CLAESSON ET AL 2,534,500

AUTOMATIC SWITCHING ARRANGEMENT

Filed Dec. 30, 1947 15 Sheets-Sheet 6

INVENTORS:
PER HARRY ELIAS CLAESSON
IVAN WITALIS GRUNDIN
BY Richardson, David and Nordon
ATTYS Dec. 19, 1950 P. H. E. CLAESSON ET AL 2,534,500

AUTOMATIC SWITCHING ARRANGEMENT

Filed Dec. 30, 1947 15 Sheets-Sheet 7

INVENTORS:
PER HARRY-ELIAS CLAESSON
IVAN WITALIS GRUNDIN
BY Richardson, David and Nordon
ATTYS Dec. 19, 1950 P. H. E. CLAESSON ET AL 2,534,500

AUTOMATIC SWITCHING ARRANGEMENT

Filed Dec. 30, 1947 15 Sheets-Sheet 8

INVENTORS:
PER HARRY ELIAS CLAESSON
IVAN WITALIS GRUNDIN
By Richardson, David and Nordon
ATTY'S INVENTORS:
PER HARRY ELIAS CLAESSON
IVAN WITALIS GRUNDIN
BY Richardson, David and Nordon
ATTY'S

AUTOMATIC SWITCHING ARRANGEMENT

Filed Dec. 30, 1947 15 Sheets-Sheet 10

INVENTORS:
PER HARRY ELIAS CLAESSON
IVAN WITALIS GRUNDIN
By Richardson, David and Nordon
ATTYS INVENTORS:
PER HARRY ELIAS CLAESSON
IVAN WITALIS GRUNDIN
By Richardson, David and Nordon
ATTY'S INVENTORS:
PER HARRY ELIAS CLAESSON
IVAN WITALIS GRUNDIN
By Richardson, David and Nordon
ATTYS

AUTOMATIC SWITCHING ARRANGEMENT

Filed Dec. 30, 1947 15 Sheets-Sheet 13

INVENTORS:
PER HARRY ELIAS CLAESSON
IVAN WITALIS GRUNDIN
BY Richardson, David and Nordon
ATTY'S Dec. 19, 1950 P. H. E. CLAESSON ET AL 2,534,500

AUTOMATIC SWITCHING ARRANGEMENT

Filed Dec. 30, 1947 15 Sheets-Sheet 14

INVENTORS:
PER HARRY ELIAS CLAESSON
IVAN WITALIS GRUNDIN
BY Richardson, David and Nordon
ATTYS Dec. 19, 1950 P. H. E. CLAESSON ET AL 2,534,500

AUTOMATIC SWITCHING ARRANGEMENT

Filed Dec. 30, 1947 15 Sheets-Sheet 15

REV'

INVENTORS:
PER HARRY ELIAS CLAESSON
IVAN WITALIS GRUNDIN
By Richardson, David and Nordon
ATTY'S Patented Dec. 19, 1950

2,534,500

UNITED STATES PATENT OFFICE 2,534,500

AUTOMATIC SWITCHING ARRANGEMENT

Per Harry Elias Claesson, Jakobsberg, and Ivan Witalis Grundin, Stockholm, Sweden Application December 30, 1947, Serial No. 794,510
In Sweden November 14, 1946

Section 1, Public Law 690, August 8, 1946
Patent expires November 14, 1966

4 Claims. (Cl. 179—18)

The present invention refers to a transmitting system for the communication of intelligence and/or to an automatic switching arrangement between two exchanges comprising a plurality of subscribers' stations connected to each of said exchanges, a plurality of trunklines connected between said exchanges for communication of any of the stations at one exchange to any of the stations at the other exchange, the calling exchange comprising selecting means connectable to said stations for selecting an idle trunkline, transmitting means coupled to said selecting means and arranged to receive signal combinations from a station and rapidly to transmit said signal combinations to the called exchange when an idle trunkline has been selected for establishing said communication, the called exchange being provided with means for receiving and storing these signal combinations, each exchange comprising means for disconnection of its exchange switching equipment from the said selected line after the necessary signal combinations for establishing a communication at the receiving exchange have been received, means at the called exchange for selecting an idle trunkline to the calling exchange, and means at the calling exchange for reconnecting the calling station with the thus selected trunkline and the corresponding switching circuit at the calling exchange in which the calling station is awaiting communication, as soon as the switching operations at the called exchange have proceeded to a predetermined switching stage.

In signal, telegraph and telephone systems, particularly for long distance traffic, lines and the corresponding repeaters represent a considerable capital investment. Such lines and repeaters should therefore be utilised in the highest possible degree, and all non-profitable use of the lines and repeaters should be avoided.

The object of the present invention is to minimise the time during which lines and the corresponding equipments are kept busy and to eliminate all waste time. Heretofore considerable time has been wasted in setting up a communication, for example in dialling a subscriber's number and the very long time often lost in answering a call. This lost time is causing an undesirable load with respect to the line equipment.

According to the present invention said loss of time is lessened due to the fact that switching signal indications or signal combinations are rapidly transmitted, for example by the transmission of different signal combinations of direct or alternating current pulses or by the transmission of different frequencies over the selected trunkline, whereby each indication or combination represents a certain switching signal indication. After a rapid transmission of said switching signal indications over the trunkline it is disconnected from the operated switches at both exchanges, and it is then free to be used for any other communication.

When the called subscriber finally answers, an idle trunkline is rapidly selected and connected to the answering subscribers at the called exchange and at the calling exchange, where they are connected to cord circuits, switches, group selectors and other switching equipment already engaged for establishing the desired communication.

The saving of time can in this manner be considerable and of great importance for the economical exploitation of a certain number of trunk lines. If, for example, seven digits are needed for the operation of all selecting organs belonging to the receiving district for establishing connection with a certain subscriber, the time needed amounts to about 7 seconds. If, further, the average time, until the called subscriber answers, amounts to 30 or 20 seconds, a total switching time of 37 respectively 27 seconds is needed.

According to the present invention 25 of said 27 seconds can be saved and the trunk line utilised for other service during the said saved time.

The average waiting time, until the called subscriber answers a call, is probably higher than the above mentioned figure, as the waiting time also includes time needed for the transmission of a plurality of ringing signals, in the case that the subscriber cannot answer right away, or if he answers after a very long time.

The invention will be better understood by the following description in connection with the accompanying drawings, in which—

Figure 1:
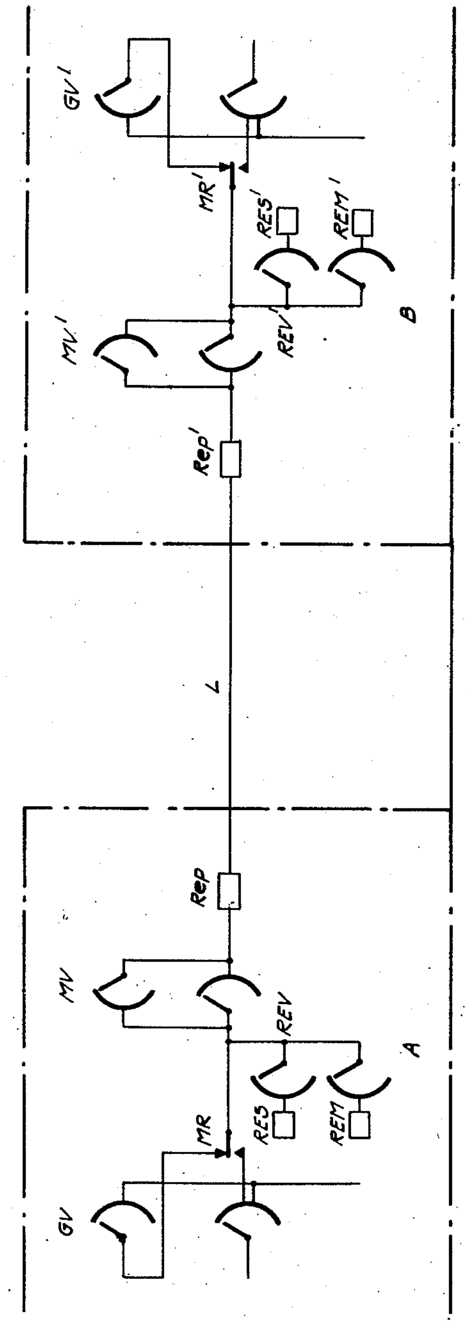
Fig. 1 shows in diagrammatic form the switching equipment at the calling (A) and at the called (B) exchanges.

In Fig. 1 traffic is conducted from a preceding switching organ, for example a pre-selector or a group selector, over a group selector GV for numerical selection, and which selector GV in certain decades is provided with devices for passing a communication from the exchange A over a group of lines L to exchange B.

Group selectors and final selectors for interior traffic or for traffic to other exchanges can in known manner be connected to other decades.

The equipment at exchange A further comprises the following principal parts: set of intermediate relays MR, intermediate selectors MV, relay repeating set Rep for one or two directions, transmitting register RES and receiving register REM provided with register selector REV. The intermediate selector MV is used in part for non-numerical selection of a vacant relay repeating set for outgoing traffic and in part for numerical selection of a certain intermediate relay set MR, when a connection is reestablished, and for finding a vacant intermediate relay set for incoming traffic.

At exchange B the same elements are provided and marked in similar manner as at exchange A as follows: GV', MR', REV', RES', REM', MV', Rep'.

When a call is put through as later on will be described said intermediate selector MV shall at the same exchange first be used for finding an idle relay repeating set and thereafter for numerically establishing communication between the originally used group selector with its corresponding intermediate relay set MR and the newly selected trunkline, when the B-subscriber, for example, has answered the call, or at some earlier stage of the switching.

In order to establish communication, relay repeating sets have to be connected to a trunkline twice. The intermediate relay sets MR are provided with means for connection and disconnection of the transmitting register RES and the receiving register REM.

Figures 3, 16:
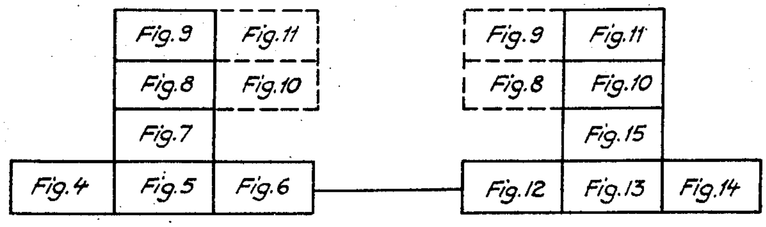
Fig. 3 shows examples of numbers and consecutive order of positive and negative current pulses, to which a digit or a signal is translated for the transmission of same.
Fig. 16 is a block diagram showing the arrangement of Figures 4–15.

The transmitting register RES translates the dial impulses from a subscriber connected to exchange A into pulse or signal combinations, which are characteristic of the said relay repeating set REP or REP'. If the relay repeating sets are arranged to transmit signal combinations by means of different signal frequencies, the register is arranged to indicate to the relay repeating set the kind of signal combinations which should be transmitted, so that the relay repeating set can transmit the corresponding frequencies. Depending upon how the relay repeating set is constructed, the different signal combinations, for example dial impulses, can be transmitted simultaneously or one at a time. If the different signal combinations should be transmitted by means of current impulses, these pulses can be modulated on a voice frequency carrier signal. Positive and negative pulses can be combined in a suitable manner, whereby, as shown in Fig. 3 a sufficient number of signal combinations can be obtained by means of four pulses.

In the following detailed description pulse signalling has been used. The invention is, however, not limited to this embodiment, but signal combinations can be transmitted in any other manner, if the transmission is sufficiently rapid. At the receiving exchange the signal combinations are translated into dial impulses by the aid of the register REM', which impulses in known manner are transmitted to the telephone system.

Figure 2:
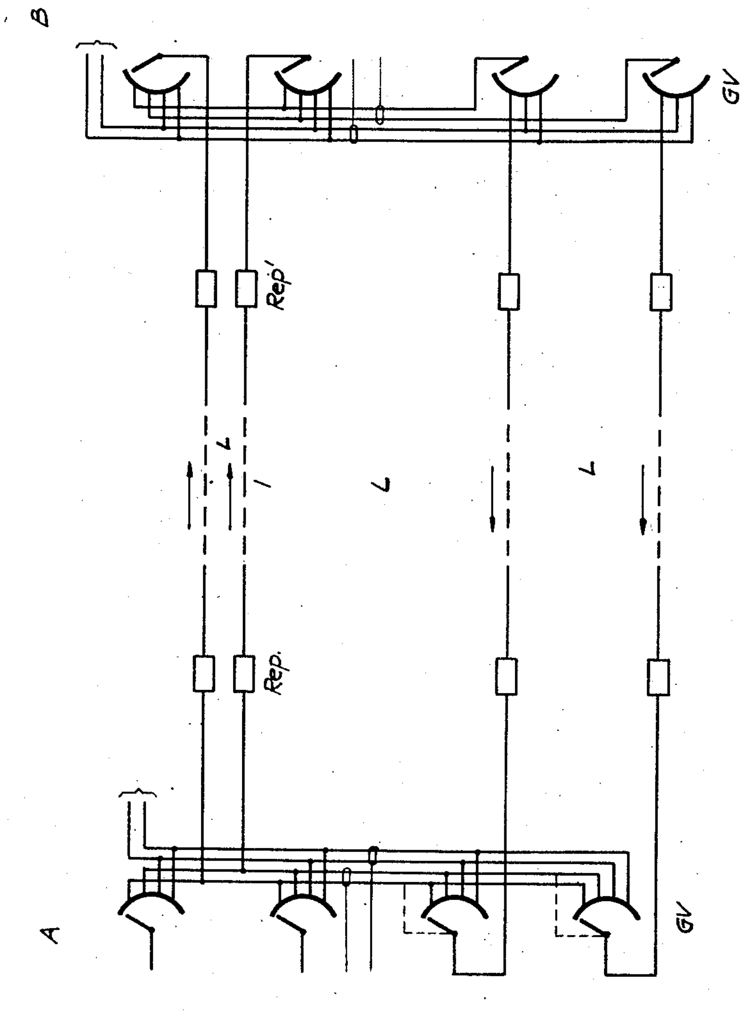
Fig. 2 shows in diagrammatic form an arrangement similar to that shown in Fig. 1, but the relay sets MR are lacking and are included in the equipment of the group selectors GV.

In Fig. 2 the function of the intermediate relay sets MR is taken care of by the group selector GV, which in this case should be provided with the corresponding arrangements.

The group selector is arranged to seek other idle group selectors or line finders as well as to select relay repeating sets numerically or non-numerically. The incoming side of certain group selectors are in this embodiment connected to incoming relay repeating sets.

Figure 4:
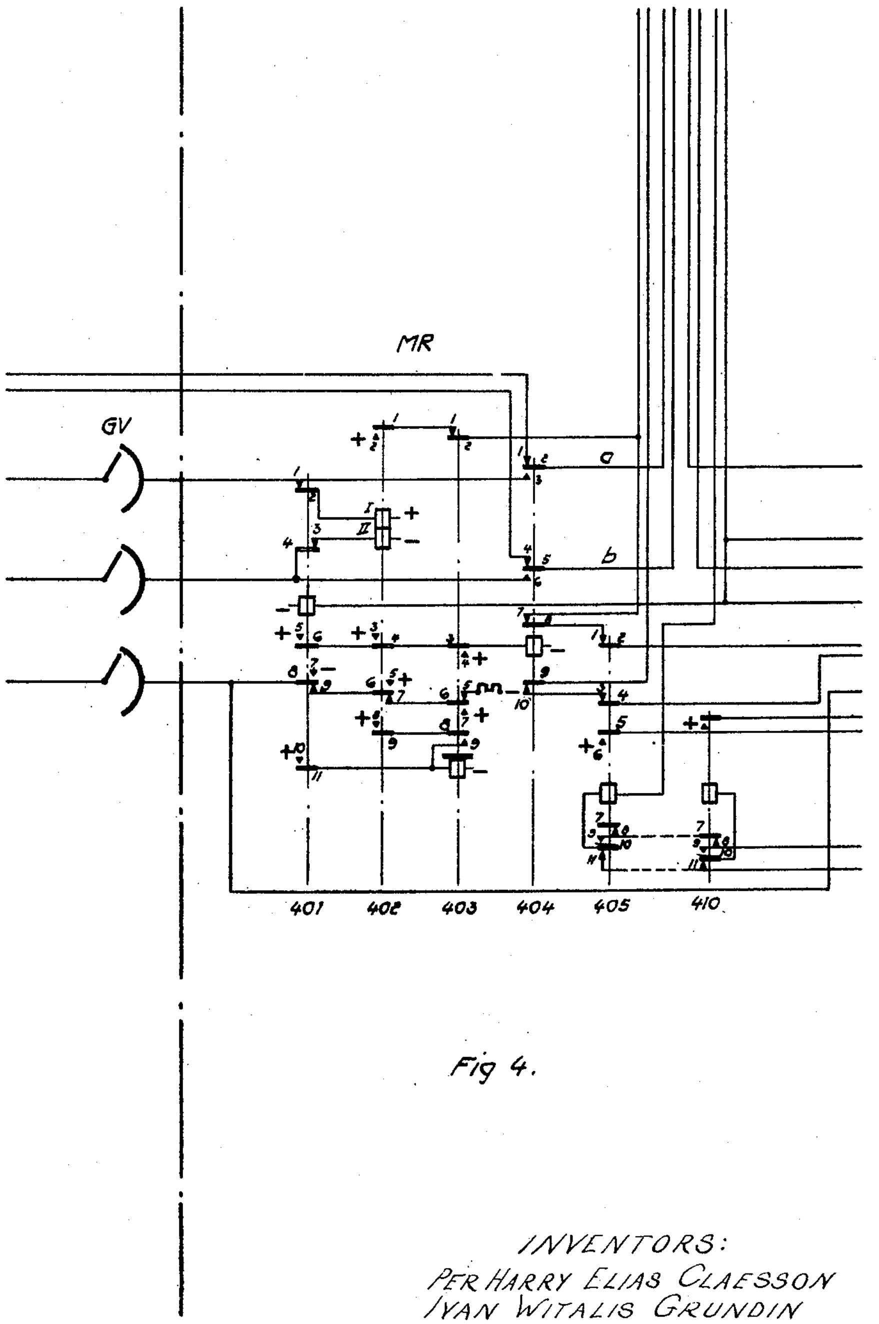
Figs. 4–9 show detailed diagrams of the switching equipment at a calling exchange A according to the diagrammatic arrangement shown in Fig. 1.
Figure 6:
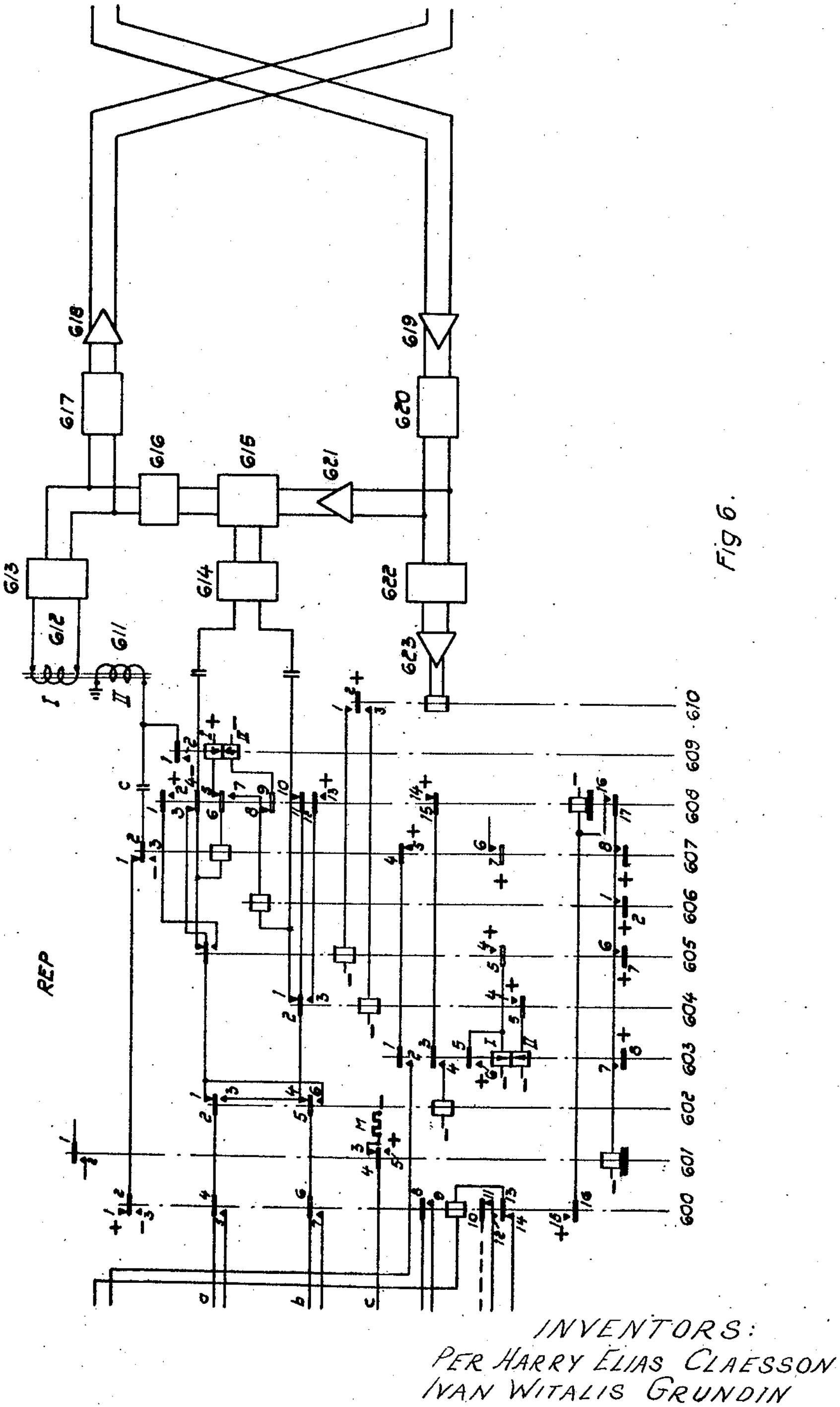
Figure 12:
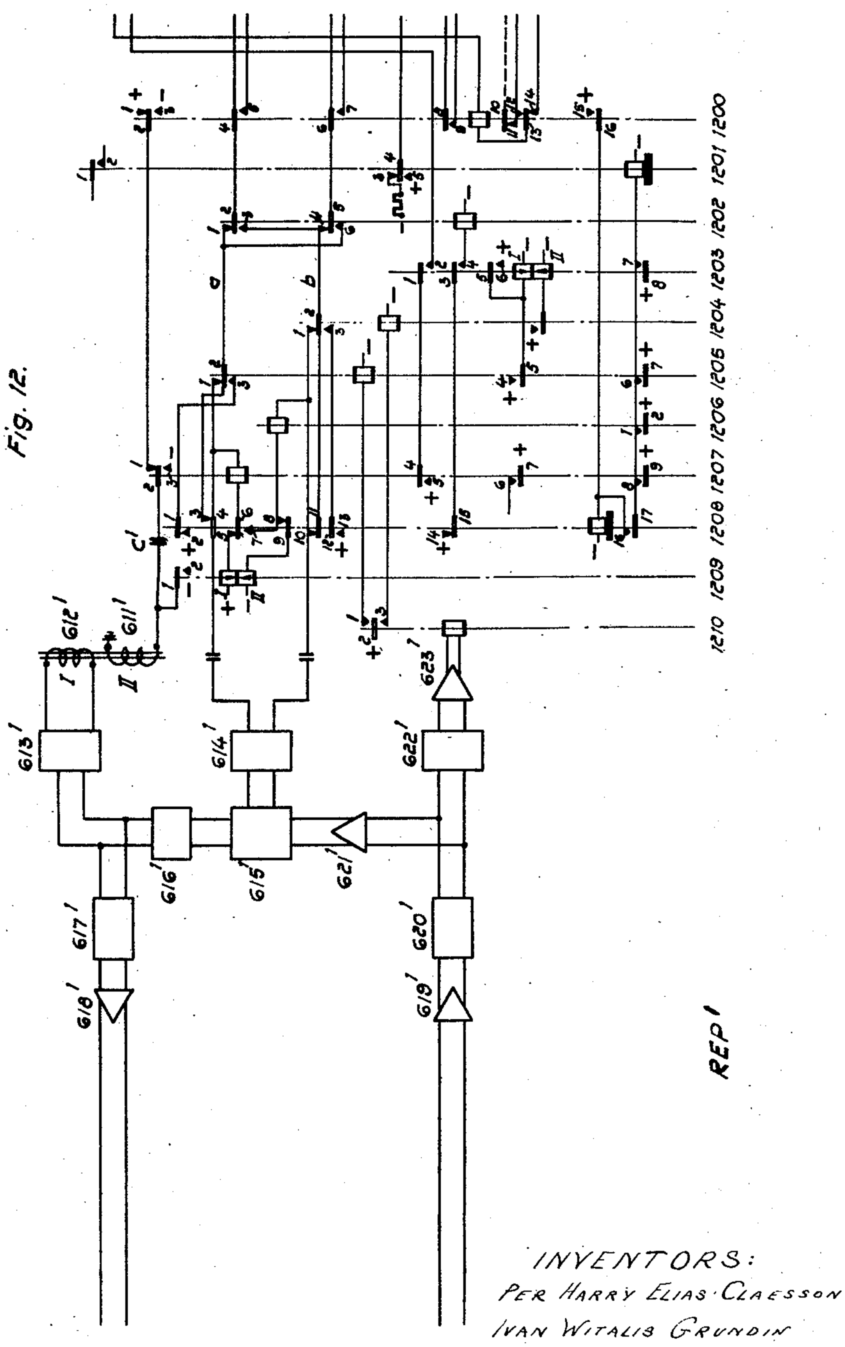
Figure 13:
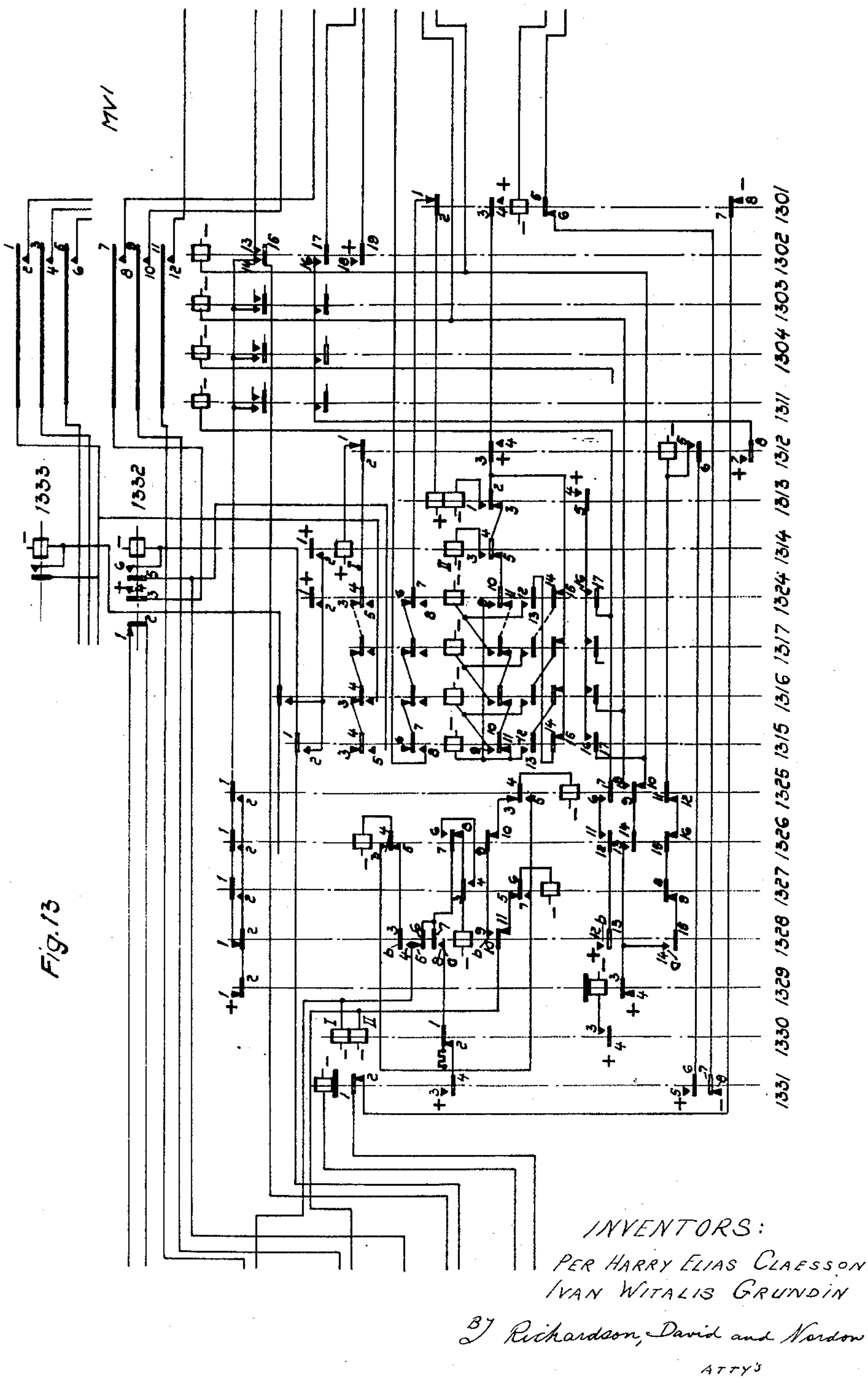
Figure 14:
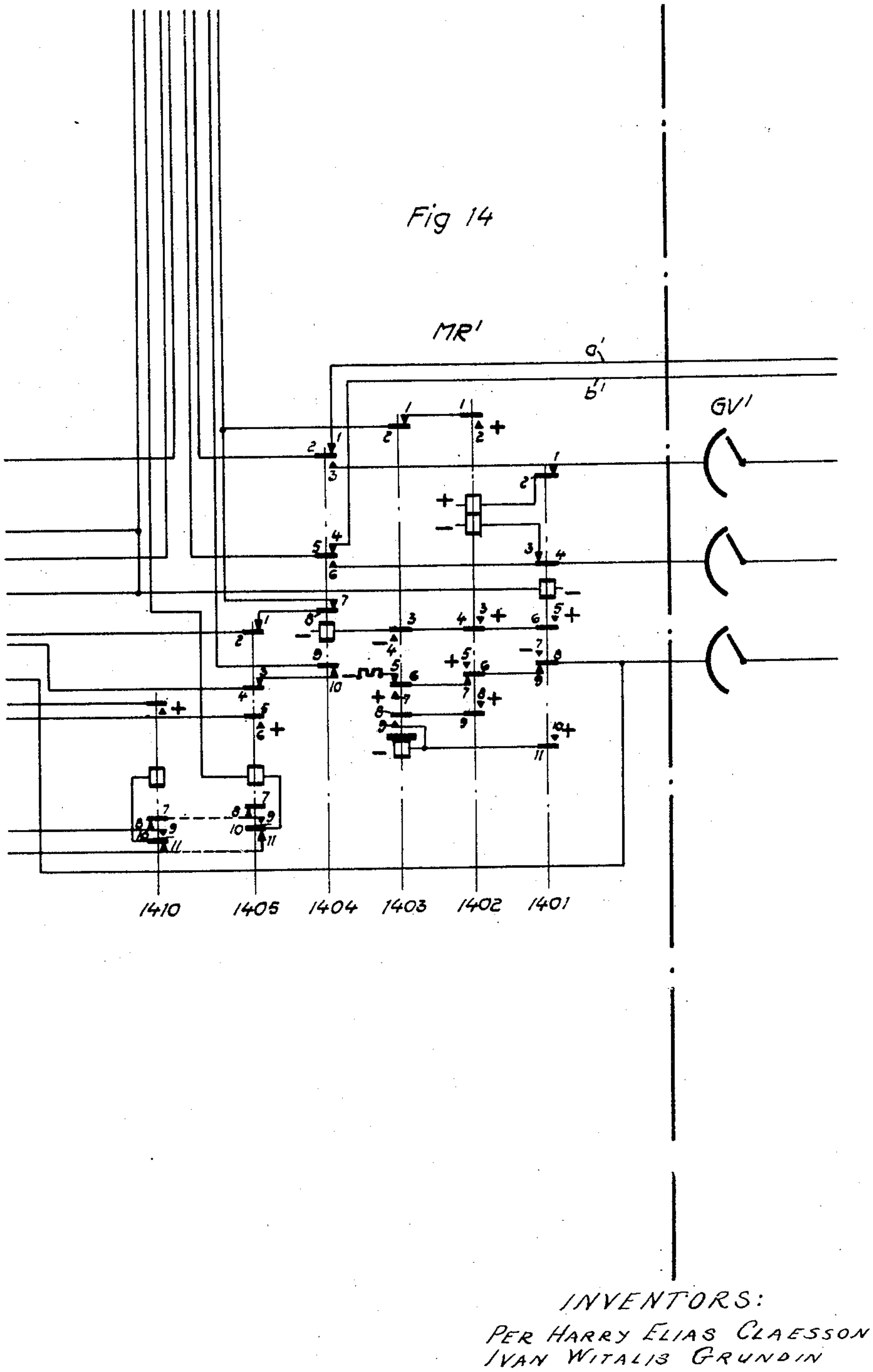
Figure 15:
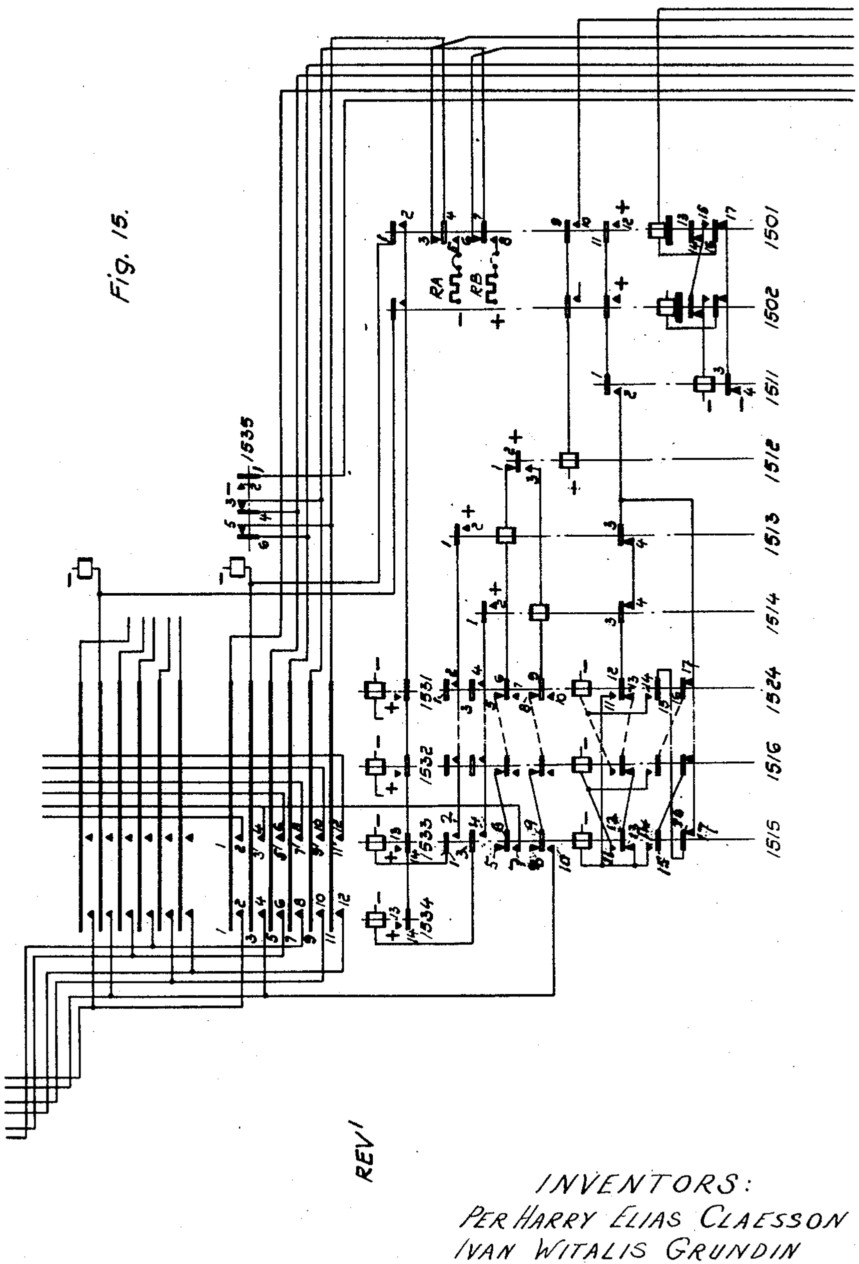

Figures 6 and 12 show a four-wire communication long-distance line arrangement and corresponding repeaters. As before mentioned the relay repeaters are in the shown embodiment arranged for pulse signalling. The signal combinations according to Fig. 3 obtained from the register RES should be received by the relays 607 and 608, Fig. 6, over the intermediate relay set MR, Fig. 4, and the intermediate selector MV. Relays 607 and 608 then direct the transmission of pulses over the trunk line.

The pulses are generated by the aid of a condenser C, Fig. 6, which is charged and discharged by the primary winding 611 of transformer 611—612, whereby the charge or discharge takes place in any desired sequence, depending upon which signal combinations should be transmitted. Relay 601 is a slow-acting block relay of known type. Relay 602 repeats the signals of the B-subscriber and also other back-impulse signals.

In order to transmit the different signal combinations from the register RES to the relay repeating set, different switching combinations between the *a*- and *b*-wires are utilised, for example, interruption between the *a*- and *b*-wires, connection of the *b*-wire to minus potential, and short-circuiting of the loop between the *a*- and *b*-wires. In the relay repeating set relay 607 will be deenergised, when the loop between *a*- and *b*-wires is interrupted, and again energised when the loop circuit is closed. When the *b*-wires is coupled to minus potential in the register, relay 609 is energised. When relay 607 is energised, condenser C is charged and a current pulse in a certain direction, here called positive, is transmitted. When relay 607 is deenergised, the condenser is discharged, and a current pulse is obtained through the transformer winding 611 in opposite direction, herein called negative. When relay 609 is energised and deenergised, upon momentarily connecting the *b*-wire to minus in the register, and when relay 607 is energised the condenser C is primarily shortcircuited and immediately thereafter charged again, whereby a new positive pulse is obtained through the winding of the transformer 611.

The different signal combinations to be transmitted over the line are composed of these pulses according to the following table according to pulses transmitted from the register RES to the relay repeating set Rep:

0=minus-potential to the *b*-wire, once.
1=minus-potential to the *b*-wire, twice.
2=minus-potential to the *b*-wire, three times.
3=1 impulse (interruption of the loop between *a*- and *b*-wire, followed by a closing of the loop circuit).

4=2 impulses.
5=minus-potential to the *b*-wire, followed by 1 impulse.
6=1 impulse, followed by a minus-potential over *b*-wire.
7=minus-potential over the *b*-wire twice, and thereafter 1 impulse.
8=1 impulse, followed by minus-potential over *b*-wire twice.
9=minus-potential over the *b*-wire, followed by 1 impulse, and thereafter minus-potential over the *b*-wire.

It is, of course, understood that these signal combinations can be chosen at will as well as the type of signal. Thus the signals can be composed of different frequencies, for example a frequency for each cipher or signal or combination of these frequencies.

The signal combinations transmitted over the line and received by a relay repeating set, Fig. 12, is transferred to a succeeding intermediate selector MV' and receiving register REM' by means of momentarily connecting one or the other or both *a*- and *b*-wire to ground.

In the following a description of the functioning of the system as shown in Fig. 1 will be described.

A subscriber or operator at exchange A obtains connection in known manner over a group selector GV to an idle intermediate relay set MR. The said relay set MR starts a register selector REV and connects a register RES. When a register has been connected a special signal combination, characteristic of the intermediate relay set MR, is transmitted to the register, in the present case one or more certain potentials over the *a*- and *b*-wires, and which special signal combination is stored in one or some of the relays 802 to 807 inclusive. This register RES, Figs. 8–9 now receives the number of the desired subscriber. When the entire number has been received by the register, said register RES starts an intermediate selector MV for non-numerical seeking of an idle relay repeating set REP and a corresponding line to the exchange B.

When such a relay repeating set has been connected, it transmits a call to a corresponding relay repeating set REP' at the exchange B. This relay repeating set REP', after having received the call, transmits a signal, for example a positive pulse, in the other direction over the line to the calling relay repeating set REP, which signal is retransmitted by same to the register RES. The register RES now transmits a signal to the relay repeating set REP' at the B-exchange, which relay repeating set in the meantime has been connected to an intermediate selector MV'. The relay repeating set REP' now retransmits the signal received previously from the register RES to the intermediate selector MV', which then starts a non-numerical seeking of an idle intermediate relay set MR'. At the same time a selection of a vacant receiving register REM' is started by the register selector REV'.

When a register REM' has been connected, a new signal, for example a negative pulse, is transmitted from the relay repeating set REP' at the B-exchange to the relay repeating set REP at the A-exchange, which re-transmits the said signal to the register sender RES. When said signal has been received the register RES transmits the stored subscriber's ciphers in the form of certain signal combinations as above indicated, and which in the receiving register REM' are transformed into certain indications corresponding to the said ciphers. When all the signal combinations corresponding to the called number have been transmitted, a signal, for example a signal combination comprising one or more ciphers, is transmitted, which signal indicates which intermediate relay set MR at the exchange A is being used for setting up the call. The register RES is thereafter disconnected and disengaged from the circuit and it can now be used for another call.

The intermediate selectors MV and MV' at the A- and B- exchanges are disengaged at the same time. At the A-exchange the call is now switched through to the group selector GV and to the intermediate relay set MR, and at the B-exchange from the intermediate relay set MR' to the register selector REV' and the register REM'.

The lines between exchanges A and B and the corresponding repeaters are now idle and can be utilised for other calls. The sender can be utilised for new calls also. The register REM' starts setting up the call from the intermediate relay set MR' at the B-exchange to the desired subscriber, as soon as a cipher of the subscribers' number has been received, and the register successively transmits the received signal combinations corresponding to the called number in the shape of normal series of impulses. When the called subscriber answers the call, the answering signal is in known manner transmitted by the final selector and is received by a relay in the receiving register REM'. This register now starts an intermediate selector MV' at the exchange B for seeking an idle relay repeating set REP' at exchange B and its corresponding line to exchange A. When a relay repeating set REP and intermediate selector MV are connected at the exchange A, the relay repeating set REP transmits an answering signal, for example a positive pulse, to the receiving register REM'. This register then transmits to the intermediate selector MV at exchange A the special signal combination previously mentioned, for example one or more ciphers, specific to the previously used intermediate relay set MR, and the intermediate selector MV numerically selects the said intermediate relay set MR, to which the calling subscriber is connected. When the register REM' has transmitted the special signal combination, the register REM' and the corresponding register REV' are disconnected, and when the intermediate selector MV at the A-exchange has been correctly connected to the corresponding intermediate relay set MR, the operating organs of the intermediate selector MV are disengaged. The call is now completed, and the intermediate relay sets MR and MR' and the repeating relay sets REP and REP' only are now engaged.

When the called subscriber answers, he receives a signal to await, for example a special tone or a verbal communication over a talking machine: "Await a long distance call."

This feature is important, particularly if the call cannot be established right away on account of all circuits being busy at the time. If the calling subscriber terminates his call after all the digits have been transmitted and communication has been established before the called subscriber has answered the call, a special clearing signal is transmitted, for example another tone or a communication over a talking machine: "Call cancelled." The arrangement can either be such that the calling subscriber is locked to the established circuit until a signal from the B-exchange has been received or the calling subscriber can be released, but the intermediate relay set remains operated until an answering signal has been received from the B-exchange. The device can be so arranged that the calling subscriber is released, if all digits have not been transmitted to the register REM' of the receiving exchange, but is locked, if all the digits have been transmitted.

A complete description of the switching according to Figures 4-15 is given as follows:

A subscriber connected to exchange A or to a traffic district of the said exchange desires a communication to a subscriber belonging to exchange B, number 13001. The subscriber dials the number and in known manner exchange A is connected to group selector GV, Fig. 4, which can obtain connection to exchange B. The group selector is operated in known manner for seeking a repeater set to exchange B and at the same time locates an idle intermediate relay set for group of lines to exchange B. When connection has been obtained, relay 402 is operated in known manner over the call circuits from the subscriber's instrument or from the local register.

Figure 5:
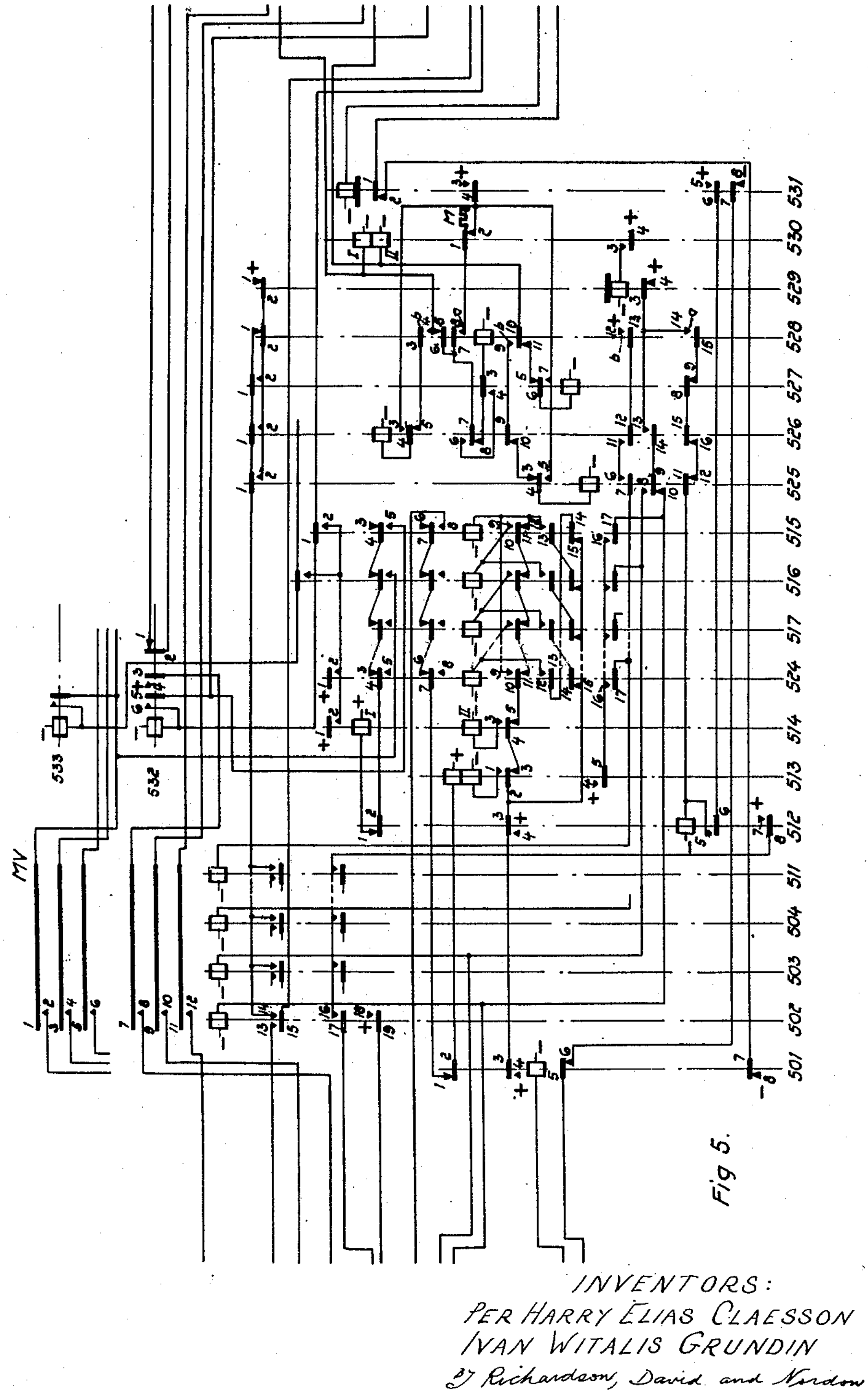
Figure 7:
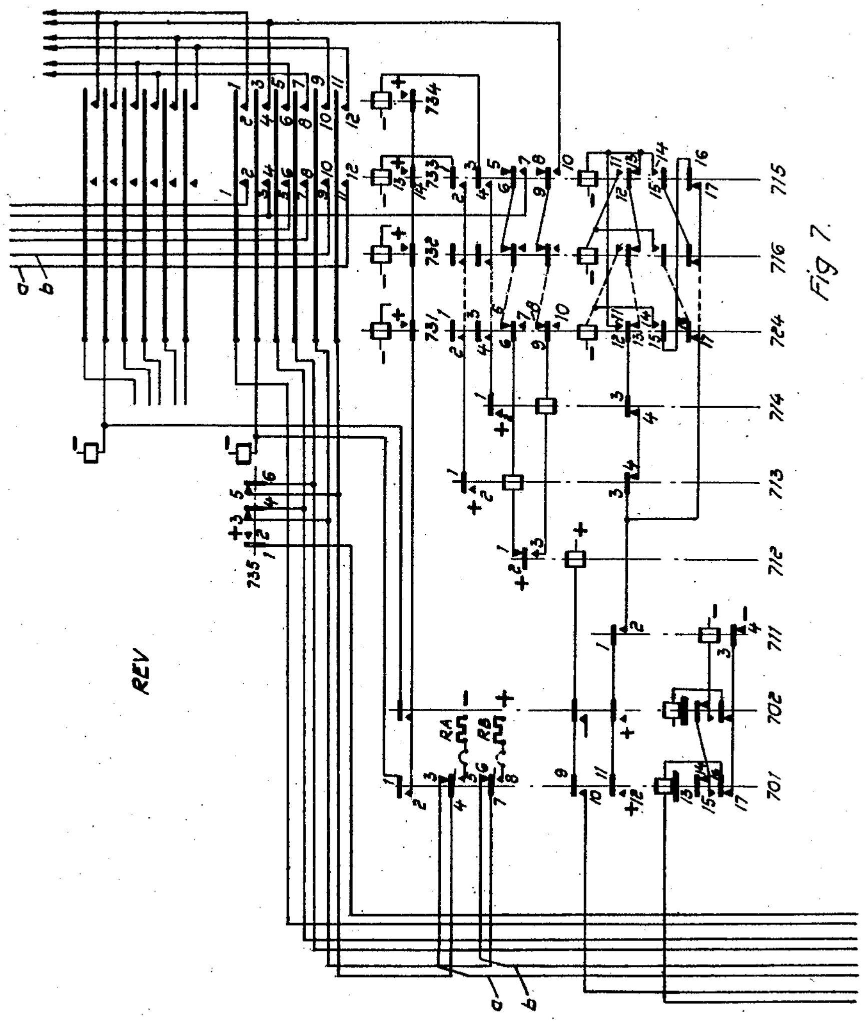
Figure 8:
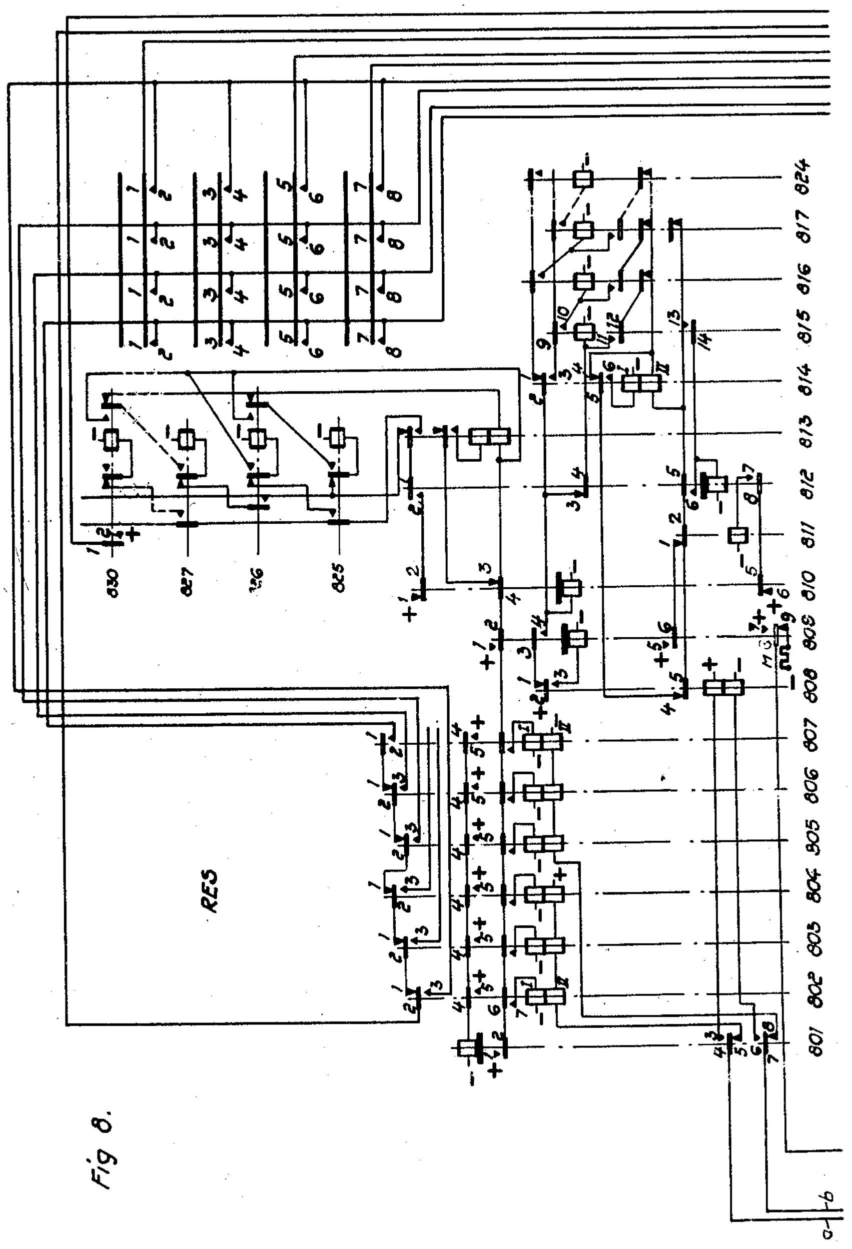
Figure 9:
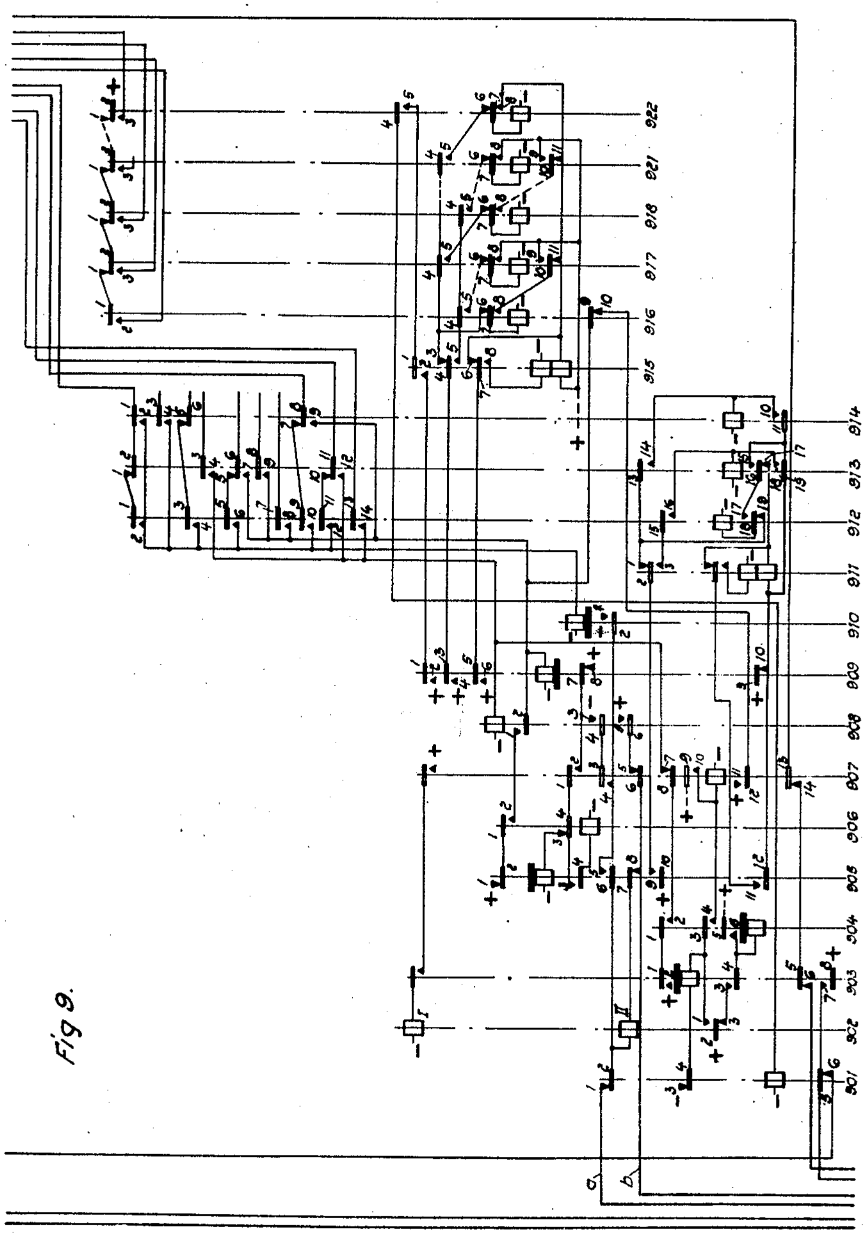
Figure 10:
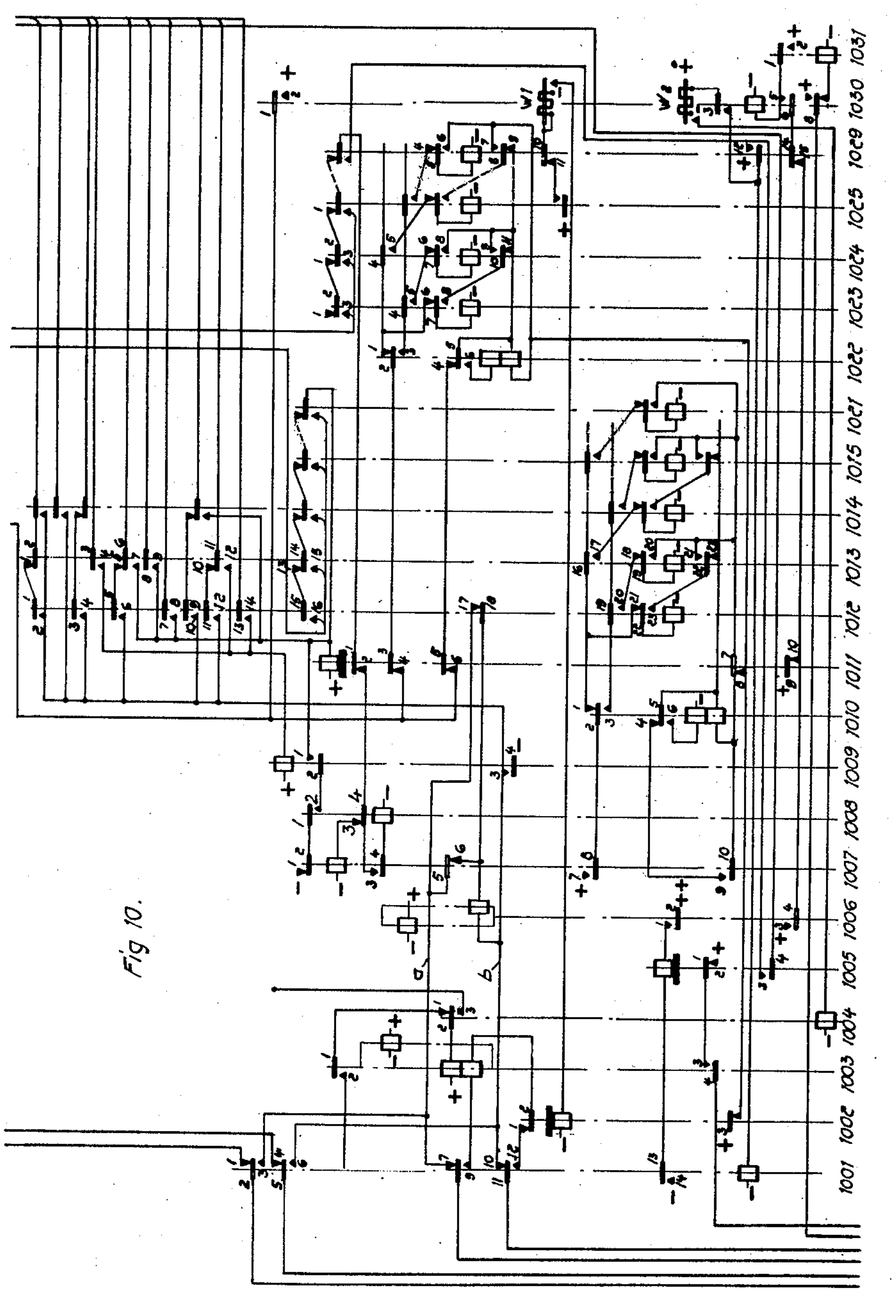
Figures 10–15 show detailed diagrams of the switching equipment at a called exchange B according to the diagrammatic arrangement shown in Fig. 1.
Figure 11:
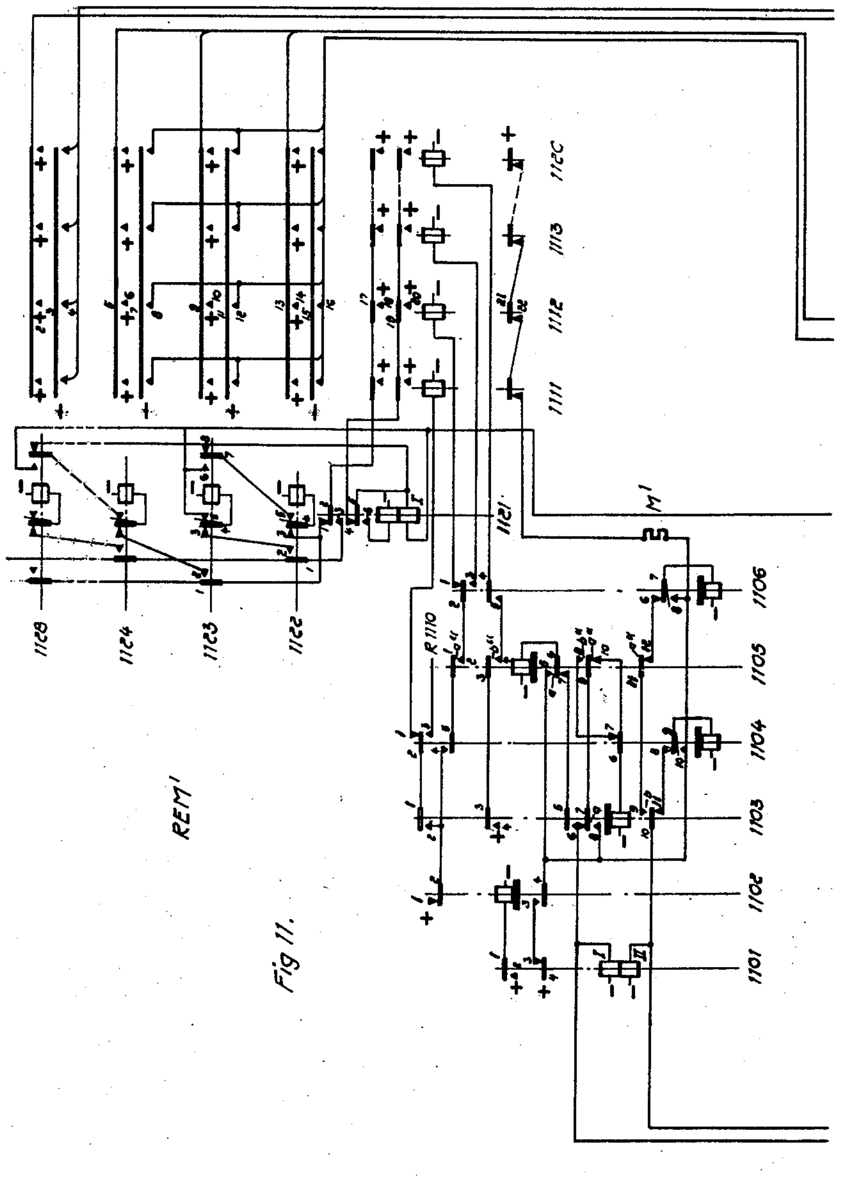

The register selector REV Fig. 7 is now started for connection of register RES, Figs. 8-9, to an intermediate selector MV, Fig. 5. The register selector REV is started over the following circuit: Plus, relay 402 contact 1—2, relay 403 contact 1—2, winding of relay 701, relay 701 contact 16—17, relay 711 contact 3—4, minus. The seeking of an idle transmitting register is started in such a manner that relays 715 to 724 inclusive operate one after another, whereby the test wire of the corresponding register is connected over the contacts 6—7 of the respective relays. If the register is idle, it has minus potential over its testing wire. When a test wire having minus potential is connected, test relay 713 is operated over the following circuit: Plus, contact 1—2 relay 712, winding of relay 713, contacts 5—6 of the following relays 715—724, contact 6—7 of the operated seeking relay (we suppose 715), c-wire to the register selector, contact 5—6 relay 901 of transmitting register RES, Fig. 9, contact 8—9 relay 809, resistance M, minus, whereby relay 713, upon being operated, breaks the current for operation of the succeeding relays 716—724. Select magnet 733 of a crossbar switch now operates according to the following circuit: Plus, relay 713 contact 1—2, contact 1—2 relay 715, select magnet 733, minus. Select magnet 733 belonging to the calling intermediate relay set is now operated over the following circuit: Plus, select magnet 733, contact 13—14 relay 701, contact 1—2, bridge magnet 735, minus. The signal and operating wires from the intermediate relay set are now connected to the register RES, Figs. 8-9. Relay 401 operates over the following circuit: Plus, contact 1—2 bridge magnet 735, minus, whereby relay 402 is deenergised. Operating circuit of relay 701 is interrupted by opening of contact 1—2 relay 402, and relay 701 is deenergized. Before the armature of this relay being slow-acting is released, a characteristic signal combination is transmitted to the register RES, and which impulse or signal combination indicates the number of the corresponding intermediate relay set.

This impulse combination is transmitted to any of relays 802 to 807 inclusive by the aid of contacts 4—5 and 7—8 of relay 701 over contacts 9—10 and 11—12 of the multiple group of the crossbar switch, and consists of connecting minus potential to $a$-wire over a resistance RA and the connecting of plus-potential to the $b$-wire over a resistance RB. In the register the windings of relays 802, 803 and 804 are connected in series with resistance RA to the $a$-wire over contacts 4—5 of relay 801 and windings of relays 805, 806 and 807 are connected in series with resistance RS to the $b$-branch over contact 7—8 relay 801. Relays 802—807 are so adjusted that, for instance, relays 804 and 807 operate for a strong current only, for example 50 milliampere, relays 803 and 806 operate for a current of medium strength only, for example 20 milliampere, while relays 802 and 805 only operate for a weak current, for example 5 milliampere. By choosing a certain resistance for connection to the respective $a$- and $b$-wires for each one of start relays 701—710 of the intermediate relay set, one or more of relays 802—807 can be caused to operate. Any desired indication for each calling intermediate relay set can thus be obtained over contacts 2—3 of said relays.

We suppose that a weak minus potential was obtained over the $a$-wire, but that no potential was obtained over the $b$-wire. Relay 802 only will then operate over the following circuit: Minus, resistance RA, contact 4—5 relay 701, contact 11—12 select magnet 733, relay 801 contact 4—5, winding II of relays 802, 803 and 804, plus. When relay 802 closes its contact 4—5, relay 801 receives current and operates its armature. Relay 802 now receives holding current over its winding I over the following circuit: Plus, contact 1—2 relay 801, contact 6—7 relay 802, relay 802 winding I, minus. Relay 801 now receives holding current over its winding I over the following circuit: Plus, contact 1—2 relay 801, contact 6—7 relay 802, winding I, minus. Relay 801 now changes $a$- and $b$-wires from the intermediate relay set to relay 808, which is deenergised, and relay 808 causes relay 809 to operate. Relay 701 is deenergised after its slow action, whereafter relay 808 is deenergised. The transmitting register RES, Figs. 8-9, is now ready to receive the digit combinations of the called subscriber.

The subscriber or the connected local register now transmits the digits, which in known manner are received by the aid of select magnets 815—824 and which are indicated in six bridge magnets in the crossbar switch so that the first digit is marked by the corresponding multiple group of bridge magnet 825, the second digit by bridge magnet 826, and so forth, so that the sixth digit of the subscriber is marked by the bridge magnet 830. The first impulse causes the operation of the armatures of select magnet 815 and the digit indicating and slow releasing relay 810, when relay 808 is deenergised and its contact 1—2 is closed.

When relay 808 operates after the end of the first digit impulse, relay 814 the winding of which has been previously short-circuited by contact 3—4 of relay 808 operates in series with the select magnet 815, which in this manner receives holding current. At the beginning of the next impulse (interruption of the circuit of relay 808), relay 808 is deenergised again, whereby the select magnet 816 now operates. Relay 812 has operated in the meantime and by breaking of its contact 3—4 now prevents select magnet 815 from receiving operating current. If the first digit is previously supposed to be 1 (for example 2 impulses), relay 808 will not be deenergised again for this digit. Relay 810 is reenergised and after a short while it is deenergised.

Relay 811 is now operated over its contact 5—6 and over contact 7—8 of relay 812. At the same time the bridge magnet 825 will operate and close a multiple contact group of the first bridge corresponding to the transmitted digit. By interrupting contact 1—2 of relay 811, relays 816—812 are deenergised, and by interruption of contact 7—8 of relay 812, upon its deenergising, relay 811 is also deenergised. The next series of impulses can now be received, which takes place in similar manner as hereinabove has been described.

When all digits have been received by the register RES, and thus bridge magnet 830 has been operated and indicated, the multiple contact group of the last digit, the seeking of an idle trunk line to exchange B is started.

Relay 405 now receives operating current over the following circuit: Plus, contact 1—2 of bridge magnet 830, contact 13—14 relay 907, contact 5—6 relay 903, contact 1—2 of the multiple contact group of the register selector Fig. 7, corresponding select magnet 733, winding relay 405, its contact 10—11, contact 5—6 relay 501, contact 7—8 relay 531, minus. Upon operation of relay 405, relay 501 is operated in series with relay 405 and over contacts 9—10 relay 405, winding relay 501 and minus. The select magnet 502 corresponding to the intermediate relay set operates over contact 5—6 of relay 405. Relays 515—524 are now started by relay 501 over its contact 3—4 for seeking an idle relay repeating set to exchange B. Relays 515 to 524 inclusive operate one after another, and each one connects a test wire from a preceding relay repeating set to relay 514 for testing. Relay 515 operates at first over the following circuit: Plus, relay 501, contact 3—4, relay 513 contact 2—3, relay 514 contact 4—5, contact 10—11 of relay 524 and of relays 523—518 (not shown), and of relays 517, 516 and 515, winding of relay 515, minus.

The test wire of the first outgoing relay repeating set is now connected to the upper winding I of relay 514 over the following circuit: Plus, winding I of relay 514, contact 1—2 relay 512, contacts 4—3 of relays 524—516, contact 4—6 relay 515, contact 3—4 relay 601, resistance M, minus. If this relay repeating set should be idle, said wire is connected to minus potential. Relay 514 is then operated, and its contact 4—5 now prevents a succeeding test relay, in this case 516, from receiving operating current. If the first relay repeating set should not be idle, relay 516 operates and connects the test wire of the second relay repeating set over its contact 4—5 to relay 514 for testing, and so forth, whereby at the same time the testing for the first line is interrupted at contact 3—4 of relay 516.

We now suppose that the first line is idle. Relay 504 then operates over the following circuit: Plus, winding I of relay 514, relay 512 contact 1—2, relay 515 contact 4—5, test wire *c*, contact 3—4 relay 601 of relay repeating set REP, Fig. 6, resistance M, minus. The bridge magnet 533 now operates over contacts 1—2 relay 514 and relay 515 contacts 1—2, and the branches *a*- and *b*- of the relay repeating set Rep are connected to the transmitting register RES.

In the register RES relay 902 is now operated in series with relay 606 and 607 of the relay repeating set according to the following circuit: Plus, winding I of relay 609, contact 5—6 relay 608, winding relay 607, *a*-wire, contact 11—12 of the multiple contact of the intermediate selector, multiple contact 7—8 of the register selector, contact 1—2 relay 901, winding relay 902, contact 7—8 relay 905, *b*-wire, contacts 5—6 of the multiple contact set of the register selector, multiple contacts 9—10 of the intermediate selector, contact 4—5 relay 602, contact 1—2 relay 604, winding relay 606, contact 8—9 relay 608, winding II relay 609, minus.

Relay 902 of the register and relay 607 of the relay repeating set are then operated. Relay 609 is not operated, because both of its windings are counter-acting. A tone signal generator is now started over contact 6—7 relay 607 and over contact 2—3 relay 607 a condenser C is now charged, and a positive current pulse is transmitted to the other exchange. The pulse is modulated on a tone frequency signal wave and transmitted to exchange B, and at that exchange actuates relay 1210, which closes its contact 1—2. Relay 1205 now receives current, and operates closing its contact 4—5.

In Fig. 6 there are apart from already described elements the following elements, which belong to the relay repeating set and to the line equipment: Transformer 611—612 with windings I and II is a current pulse transformer for the transmission of current pulses over the line. Element 614 is a filter for eliminating of not desired frequencies. Element 615 is a hybrid transformer for the 4-wire circuits shown in the present embodiment for traffic in both directions. Element 616 is an automatic amplifier and amplitude level limiting device. Element 617 is a frequency transfer device and filter for locating the talking frequency band at a suitable level of carrier communication channel.

Elements 618 are electron tube amplifiers in the outgoing line circuit. Elements 619 are electron tube amplifiers in the incoming line circuit. Element 620 is a frequency transfer device and filter. Element 621 is an amplifier for voice currents and a blocking device for tone signals not desired from the talking circuit. Element 622 is a voice frequency signal receiver and element 623 is a voice frequency amplifier and rectifier for received signals.

In Fig. 12 the corresponding elements have the same numerals, but are provided with a prime-sign.

At exchange B the following operations now take place:

If the intermediate selector is idle, relay 1200 is operated over contact 1—2 relay 1203 and prepares the operation of the said intermediate selector for connection of an idle intermediate relay set MR' and receiving register RES'. Relay 1200 operates over the following circuit: Plus, relay 1207, contact 4—5, contact 1—2 relay 1203, contact 1—2 bridge magnet 1332 of the intermediate selector, winding of relay 1200, contact 13—14 relay 1200, contact 1—2 relay 1331 of the intermediate selector and contact 7—8 relay 1301, minus. After its operation relay 1200 receives holding current in series with winding of relay 1331 over its contact 12—13. Upon closing of contact 15—16 of relay 1208, relay operates.

The intermediate selector is arranged for non-numerical seeking in direction from an intermediate relay set to an outgoing relay repeating set, and for numerical or non-numerical seeking in direction from relay repeating set to an intermediate relay set.

Numerical or non-numerical seeking is determined by a special signal combination from the calling register in such a manner that a certain signal combination causes a non-numerical seeking, while certain other signal combinations cause an operation of the intermediate selector corresponding to a numerical selection.

The device for receiving the signal combinations comprise relays 1325 to 1328 inclusive. The signal combinations transmitted over the line circuit are here chosen as indicated in Fig. 3.

An answering signal is transmitted to the transmitting register RES from the incoming relay repeating relay set as an indication that the intermediate relay set is ready to receive the signal combination. This answering signal is transmitted in the form of a positive current pulse modulated on a voice frequency carrier wave. The pulse is obtained by charging the condenser C′ in series with the impulse transformer 611′—612′ and is transmitted, when relay 1200 by its operation has indicated that connection has been obtained to the pulse receiving part of the intermediate selector according to the following circuit: Minus, contact 2—3 relay 1200, contact 1—2 relay 1207, condenser C′, winding II of transforming device, plus.

In the transmitting relay repeating set at exchange A this current pulse is received by relay 610, which momentarily closes its contact 1—2. Relay 605 now operates over said contact and closes its contact 4—5 so that relay 603 is caused to operate. Relay 602 will now operate, whereby change of direction of current through the *a*- and *b*-branches will take place in direction towards the transmitting register RES. In register RES the current direction indicating relay 902 will be deenergized. Relay 904 operates over contact 2—3 relay 902 and contact 3—4 relay 903. Upon operation of relay 904 relay 908 is energised over the following circuit: Plus, contact 1—2 relay 903, contact 1—2 relay 904, contact 7—8 relay 907, winding relay 908, minus. Relay 908 now transmits pure plus polarity over the *a*- and *b*-branches of contacts 5—6 of relay 608. Winding II of relay 609 of the relay repeating set receives a strong current, while its winding I is short circuited. On account of the elimination of one of the counteracting fields in relay 609, it will operate on account of the field of winding II. The condenser C will now be short circuited over contact 1—2 of relay 609. In the register relay 903 will now be deenergised after slow action, whereby current to relay 908 ceases and it is deenergised.

When the *b*-branch is disconnected from plus potential, relay 609 is released and a new positive current pulse is transmitted over contact 2—3 of relay 607. This current pulse is now transmitted to the relay repeating set of exchange B and is re-transmitted by same to the pulse receiving part of the intermediate selector. When the positive current pulse is received in the relay repeating set of exchange B, relay 1210 closes its contact 1—2, which causes relay 1205 to operate. Plus potential is transmitted over the *a*-branch to the intermediate selector. Relays 1328 and 1330 will now operate over the following circuit: Plus, contact 1—2 relay 1208, contact 2—3 relay 1205, contact 1—2 relay 1202, contact 4—5 relay 1200, winding I relay 1330; contact 5—6 relay 528, contact 7—8 relay 526, winding of relay 528, minus. When the positive current pulse ceases, contact 2—3 relay 1205 is opened, and the plus potential of the *a*-branch ceases.

The slow acting pulse indicating relay 1329, which was operated over contact 3—4 of relay 1330 is released after a short moment, about 100 milliseconds. Relay 1312 is now operated over its contact 3—4 and contact 14—15 of relay 1328.

The seeking relays 1315—1324 are now started over contact 3—4 of relay 1312 for seeking an idle intermediate relay set MR′. As contact 1—2 relay 1312 is open and contact 1—2 relay 1301 is closed, the test wires of the intermediate relay sets to be successively connected to the test relay 1313. When an idle intermediate relay set, having its test wire coupled to minus potential, is found, relay 1313 is operated and at its contact 2—3 interrupts the seeking operation. Upon closing of contact 4—5 of relay 1313 the select magnet 1202 is operated over contact 16—17 of the operated seeking relay (we suppose in this case 1313).

At the exchange B the select magnet 1302 now starts to hunt for an idle receiving register in the register selector. The seeking operation takes place in similar manner as previously has been described with the difference that relay 1521, now receives operating current over the following circuit: Plus, contact 18—19 select magnet 1302, contact 3—4 relay 1405, contact 9—10 relay 1404 and 9—10 relay 1501, winding relay 1512, plus. The breaking of contact 1—2 and closing of contact 2—3 of relay 1512 now causes testing to be done over the test wires of the receiving register only to the test relay 1514 over contact 9—10 of seeking relays 1515—1524. When an idle register has been found, relay 1514 is operated, the seeking operation is interrupted and it causes operation of the select magnet of the receiving register over contact 1—2 relay 1514. The bridge magnet, for instance 1535, is then operated over contact 1—2 of the corresponding select magnet (1534). The *c*-wire leading to the intermediate relay set then receives plus potential. The bridge magnet 1332, which corresponds to the relay repeating set, is now operated over contact 14—15 of the operated select magnet 1302 and contact 8—9 of relay 1200.

Relay 1200 is then deenergised as its circuit is opened at contact 1—2 of bridge magnet 1332. The common part of the intermediate selector is then disengaged and can be used for new calls. Upon closing of contacts 1—2 of relay 1200 the condenser C′ of the receiving relay repeating set REP′ is discharged, whereby a negative current pulse is transmitted to the calling relay repeating set REP at exchange A.

The said negative current pulse causes relay 610 momentarily to close its contact 2—3, whereby relay 604 is enerised. Relay 603 then receives current over contact 4—5 relay 604 through winding II, which is counter-acting the winding I, whereby relay 603 is deenergised. When contact 3—4 relay 603 is opened, relay 602 is also deenergised and the direction of current in the talking branches *a* and *b* is returned to normal.

In the sending register at exchange A relay 801 is again operated. The receiving register at exchange B is now connected to the incoming relay repeating set. In the receiving register relay 1031 is now operated in series with the test relay 1514 of the register selector. Relay 1030 is now operated over contact 1—2 of relay 1031. Contact 7—8 of relay 1030 is then closed and the bridge magnet of the register selector, in this case 1535, is operated. Relay 1031 is deenergised, when contact 8—9 relay 1030 is opened. The register is now ready to receive the signal combinations, which indicate the subscriber's number.

When relay 902 at exchange A was again operated, relay 907 was operated. The circuit for the signal combination relays 905—906 was then closed. These relays are alternatingly energised and deenergised, and during operation of relay 905 the holding circuit of relay 607 is either interrupted at contact 7—8 relay 905, or simultaneously with the interruption of the circuit, minus potential is connected to the *a*-branch to the relay repeating set over contacts 3—4 relay 907 or 1—2 relay 910. The pulse-combinations transmitted to the outgoing repeating relay set are hereinbefore indicated.

The subscriber's number was 13001. The first pulse combination to the relay repeating set shall thus be two minus potentials over the *a*-branch, which pulse combinations shall be translated by the relay repeating set to two positive pulses according to the table in Fig. 3.

In register RES crossbar switch, Fig. 8, multiple group 5—6 of bridge magnet 825 is operated, corresponding to select magnet 816. Relay 909 is energised over contact 11—12 of relay 907 and 9—10 of relay 916. Upon operation of relay 909, relay 916 is energised over the following circuits: Plus, contact 3—4 relay 909, 3—4 relay 915 and 6—7 relay 916, winding relay 916, minus.

Holding current of relay 916 is then obtained over contact 10—11 relay 917, contact 6—7 relay 915, contact 5—6 relay 909, plus. Upon operation of relay 912 over contact 9—10 relay 905 and closing of contact 11—12 relay 912, relay 910 is operated over the following circuit: Plus, contact 1—2, relay 922—916, contact 7—8 of multiple contact group 816, contact 10—11 relay 913, contact 11—12 relay 912, winding relay 910, minus. Relay 909 is deenergised at opening of contacts 9—10 relay 916. Relay 915 is then operated over the following circuit: Plus, winding relay 915, contact 10—11 relay 917, contact 7—8 relay 916. Minus potential is now connected to the *a*-branch over the following circuit: Contact 1—2 relay 901, contact 8—9 of the select magnet 734 of the register selector crossbar switch, contact 11—12 of the multiple contact field of the intermediate selector, select magnet 502, contact 1—2 relay 602, winding relay 607, contact 5—6 relay 608, winding I of relay 609, plus.

At the same time contact 7—8 of relay 905 is opened, when energised in the following circuit: Plus, contact 7—8 relay 909, contact 1—2 relay 907, contact 3—4 relay 906, winding relay 905, minus. In the relay repeating set relay 609 is operated, due to elimination of one of the electromagnetic fields in the differential relay 609. The condenser C is shortcircuited. Relay 906 is now operated over the following circuit: Plus, contact 7—8 relay 909, contact 1—2 relay 907, contact 3—4 relay 906, contact 3—4 relay 905, winding relay 906, minus.

When contact 3—4 of relay 906 is opened, relay 905 is deenergised after slow action. The short circuit contact 11—12 of relay 905 is then opened, so that relay 911 is energised in series with relay 912. The minus potential of the *a*-branch ceases, and relay 609 is deenergised. The condenser C is charged again, and a positive current pulse is transmitted to the receiving exchange. When contact 3—4 of relay 905 is opened, relay 906 is deenergised, and when its contact 3—4 is again closed, relay 905 is again energised. Relay 913 is then operated in the following circuit. Plus, contact 9—10 relay 905, contact 2—3 relay 911, contact 15—16 relay 912, winding relay 913, minus, whereafter relay 913 obtains holding current over its contact 18—19.

Upon closing of contact 11—12 relay 913, relay 908 is energised over the following circuit: Plus, contacts 1—2 of relays 916—922, contact 7—8 of the multiple contact group of the corresponding bridge magnet 825 and select magnet 816, contact 11—12 relay 913, winding relay 908, minus.

The *a*-branch now receives minus potential over contact 5—6 of relay 905 and relay 609 is caused to operate again. The transmission of another positive current pulse is prepared. When relay 905 is energised, relay 906 is energised in the above described manner, whereby relay 905 is deenergised. When relay 905 is deenergised, the minus potential of the *a*-branch is disconnected and relay 609 is deenergised, whereby the second positive current pulse is transmitted.

Relay 909 is now energised over the following circuit: Plus, contact 1—2 relay 905, contact 1—2 relay 906, contact 1—2 relay 908, winding relay 909, minus. Relay 909 now interrupts the continued transmission of signal combinations for this digit and prepares the transmission of the next digit by causing relay 917 to be energised. By interruption of contact 9—10 relay 909 relays 911, 912, 913 are deenergised. Upon operation of relay 917 the operating circuit of relay 909 is interrupted at contact 1—2 relay 917 and relay 909 is deenergised.

The transmission of the second digit, in this case the cipher 3, can begin. This cipher shall now as previously shown, be transmitted to the relay repeating set in the form of a momentaneous interruption of the line circuit over the *a*- and *b*-branches. This momentaneous interruption is transmitted to exchange B in the form of a negative current pulse succeeded by a positive current pulse.

The subscriber's second digit has been indicated by the second bridge magnet 826 in the crossbar switch of the sending register and in a multiple contact group corresponding to select magnet 815. Upon deenergisation of relay 909 the signal combination transmitting relays 905 and 906 are started in similar manner as previously has been described. When relay 905 operates, relay 912 is energised over its contact 9—10. The holding circuit of relay 607 of repeating relay set REP is interrupted by the opening of contact 7—8 of relay 905, so that relay 607 is deenergised. The condenser C is discharged by closing of contact 1—2 relay 607, whereby a negative current pulse is transmitted over the line circuit.

Relay 909 is now energised over the following circuit, which has been determined by the second dialled digit: Plus, contact 1—2 relay 922—918, contact 2—3 relay 917, contact 5—6 of the multiple contact group of bridge magnet 826 (not shown) corresponding to select magnet 818, contact 7—8 relay 912, winding 909, minus. Relay 905 is deenergised when contact 7—8 relay 909 is opened, whereby the holding circuit of relay 607 is closed again, and this relay is energised. The condenser C is then charged again, and a positive current pulse is transmitted over the line circuit.

The transmission of the third digit can now be started in a manner similar to that previously described, but with the difference that the transmitted signal combination is controlled by multiple contact group situated in the third bridge magnet 827, and which corresponds to the digit. The signal combination corresponding to the fourth digit can thereafter be transmitted and controlled by the respective multiple contact group in the fourth bridge magnet. The fifth digit is controlled by a contact group in the fifth bridge magnet, and the sixth digit is controlled by the sixth bridge magnet. The fourth and fifth bridge magnets corresponding to fourth and fifth digits have not been shown in the drawing in order not to cause confusion.

The transmitting register RES can therefore start the transmission of a signal combination to the receiving register REM', which signal combination indicates which intermediate relay set at the A-exchange, to which the calling subscriber is connected. The transmission takes place in about the same manner as for the subscriber's digits and are in this case controlled by the state of operation of relays 802—807.

When relay 909 was operated after the transmission of the sixth digit, relay 922 was operated over the following circuit: Plus, contact 3—4 relay 909, contact 3—4 relay 915, contact 4—5 relay 921, contact 6—7 relay 922, winding 922, minus. Relay 922 receives holding current, at first over contact 5—6 relay 909, and thereafter in series with relay 915, which is operated. By closing of contact 2—3 relay 922, the control of the signal combinations can be conducted over relays 802—807. As previously described only relay 805 of these relays is energised. When relay 921 is operated, and the operating current of relay 909 has been interrupted over contact 1—2 relay 921, the transmission of the signal combinations is started in similar manner as for the subscriber's digits.

Relay 905 is operated upon closing of contacts 7—8 of relay 909. Relay 912 operates in the same manner as previously described, when relay 905 closes its contact 9—10, and relay 910 is also operated upon closing of contact 9—10 relay 912.

The $a$-branch to the relay repeating set is connected to minus potential, whereby relay 609 operates as previously described. Relay 906 now operates, whereby the current to relay 905 is interrupted, and this relay is deenergised. The minus potential of the $a$-branch then ceases, relay 609 is deenergised and a positive current pulse is transmitted to exchange B. When contact 3—4 of relay 905 is opened, relay 906 is deenergised, and when contact 3—4 of relay 906 is closed, relay 905 is again energised.

The $a$-branch is connected to minus potential again, and relay 609 operates. At the same time, and after relay 911 has operated, relay 913 energises. Relay 906 now operates again, whereby relay 905 and then relay 906 are deenergised again. The minus potential of the $a$-branch is disconnected. Relay 609 is deenergised and a second positive current pulse is transmitted to exchange B. Relay 905 thereafter operates again, whereby relay 914 operates, after relay 911 is deenergised. The $a$-branch receives minus potential again, and relay 609 is again operated. When contact 8—9 of relay 914 has been closed relay 909 is operated, whereby the transmission of signal combinations is interrupted. Holding current of relay 905 is interrupted at contact 7—8 of relay 909. The minus potential of the $a$-branch is disconnected, and a third positive current pulse is transmitted.

When relay 909 has been operated, the disconnection relay 901 is operated over the following circuit: Plus, contact 1—2 relay 909, contact 1—2 relay 909, contact 1—2 relay 915, contact 4—5 relay 922, winding relay 901, minus. The holding current to the outgoing relay repeating set is opened at contact 1—2 of relay 901, and relay 607 is deenergised, and a negative current pulse is transmitted to the relay repeating set of the exchange B.

In the relay repeating set relay 601 is now deenergised, when contact 8—9 of relay 607 is opened. The outgoing relay repeating set is now disconnected. The bridge magnet 532 of the intermediate selector is deenergised, when contact 4—5 of relay 601 is opened. After about 200 milliseconds more than the time needed for deenergising relay 601, the operating circuit of the bridge magnet 735 of the register finder is interrupted, whereafter relay 903, which has been operated over contact 3—4 relay 904 and 9—10 relay 907, is deenergised upon opening of contact 3—4 relay 901.

When the bridge magnet 735 of the register selector is deenergised, relay 401 is deenergised, when contact 1—2 of bridge magnet 735 is opened. Relay 402 is then again connected between the subscriber's line branches and is operated over the subscriber's instrument, whereby relay 402 controls the holding circuit of the operated group selector.

At exchange A only relays 402 and 403 are operated in the intermediate relay set, and the calling subscriber now awaits answer from the called subscriber.

We will now observe at exchange B what takes place from the moment, when the signal combination of the first digit is transmitted. This digit, which was supposed to be transmitted was I in the form of two positive current pulses. In the relay repeating set at exchange B receiving relay 1210 was energised by the first positive pulse and closed its contact 1—2. Relay 1205 is then energised and connects over its contact plus potential to the $a$-branch and to the receiving register REM' over the following circuit: Plus, contact 1—2 relay 1208, contact 2—3 relay 1205, contact 1—2 relay 1202, contact 11—12 of select magnet 1302 of the intermediate selector MV', select magnet 1534 of the register selector, contacts 7—8, and 1—2 of relay 1001, winding I relay 1101, minus, and contact 6—7 relay 1103, contact 9—10 relay 1105, winding relay 1103, minus.

Relays 1103 and 1105 are so-called two-step relays, that is, they close certain contacts, here marked $a''$ for a weak current, and all contacts marked $b''$ for a strong current. Relay 1103 now operates and receives holding current over its contact 7—8 in series with resistance M'. In this manner relay 1103 only receives a weak current and therefore only closes its contacts marked $a''$.

Relay 1101, which was operated over the above mentioned circuit from the receiving relay repeating set, causes relay 1102 to operate over its contact 1—2. When the first positive current pulse ceases, relay 1101 is deenergised. Relay 1103 now receives a stronger current over contact 3—4 relay 1101 and contact 3—4 relay 1102, and now closes all its contacts. When the second positive current pulse arrives from exchange A, it is transferred to the receiving register in the above mentioned manner. The circuit of the positive current pulse from the receiving relay repeating set is then the following: Plus, contact 1—2 relay 1208, contact 2—3 relay 1205, contact 1—2 relay 1202, contact 11—12 of bridge magnet 1332, contact 7—8 relay 1534, contact 1—2 relay 1001, winding I of relay 1101, minus, whereby relay 1001 operates. A branch circuit continues over: contact 5—6 relay 1103, contact 6—7 relay 1105, minus, whereby relay 1105 operates and receives holding current in series with the resistance M'.

When the second positive current pulse terminates, the plus potential of the $a$-branch ceases, whereby relay 1101 is deenergised. Contact 3—4 of relay 1101 is then closed, whereby relay 1105 receives a stronger current over contact 3—4 relay 1102, contact 5—6 relay 1105, and closes all its contacts. No more switching signal combinations for the first digit are received.

After about 100 milliseconds relay 1102 is deenergised. The circuit for marking the first digit in the crossbar switch of the receiving register is then closed. The different select magnets 1111—1120 correspond to subscriber's digits 0-9, so that the first select magnet 1111 corresponds to the digit 0 and is indicated by the signal combination corresponding to the cipher 0. The second select magnet 1112 corresponds to the digit 1 and is indicated by the signal combination of the cipher 1. The third select magnet corresponds to the digit 2 and so forth, so that the 9th select magnet corresponds to the digit 9. All circuits related to relays 1103—1106 for indicating all signal combinations are not shown here.

The select magnet 1112 is now energised over the following circuit: Plus, contact 1—2 relay 1102, contact 4—5 relay 1104, contact 1—2 relay 1105, contact 1—2 relay 1106, select magnet winding 1112, minus.

When the select magnet 1112 is energised and closes its contact 17—18, the first bridge magnet 1122 is energised and indicates by closing its multiple contact sets the first subscriber's digit. When the contact 21—22 of select magnet 1112 is opened, relay 1105 is deenergised after a short slow action. The select magnet 1112 is then deenergised. When its contact 19—20 is opened, relay 1121, which previously was shortcircuited by this contact, operates in series with the bridge magnet 1122 over the following circuit: Plus, relay 1031 contact 1—2, winding relay 1121, contact 7—8 bridge magnet 1123, contact 4—5 bridge magnet 1122, winding of bridge magnet 1122, minus.

The signal combination for the second digit can now be received by the receiving register REM'. The second digit, which was assumed to be 3, was transmitted to the exchange B in the form of a negative current pulse, succeeded by a positive current pulse.

This digit shall be stored in the second bridge magnet 1123. When the negative pulse is received at exchange B, relay 1210 is energised and closes its contact 2—3, whereby relay 1204 operates and closes its contact 2—3. Plus potential is thus connected to the $b$-branch leading to the receiving register. In the same register relays 1101 and 1104 are now energised over the following circuit: Plus, contact 12—13 relay 1208, contact 9—10 in the actuated multiple group of the bridge magnet 1332 of the intermediate selector, contact 5—6 in the actuated multiple contact group of the bridge magnet 1535 of the register selector, contact 4—5 relay 1001 in the register REM', winding II of relay 1101, minus, which latter relay operates, and contact 10—11 relay 1103, contact 8—9 relay 1104, which is energised and receives holding current with a weak current over contact 9—10 in series with resistance M', break contacts 21—22 of the select magnets, plus.

When the positive current pulse is received by the relay repeating set, it is transferred to the register REM', which transfer earlier has been described in form of a plus potential connected to the $a$-branch. Relay 1103 is then energised again, as previously has been described. When the positive current pulse has ceased, relay 1101 is deenergised, and as no new signal is received, relay 1102 also deenergises after slow action. Select magnet 1114 (not shown) receives current over the following circuit: Plus, contact 1—2 relay 1102, contact 1—2 relay 1103, contact 2—3 relay 1104, select magnet 1110 (not shown), minus. The second bridge magnet 1123 is now energised over the following circuit: Plus, contact 17—18 select magnet 1110, contact 2—3 relay 1121, contact 1—2 bridge magnet 1122, contact 3—4 bridge magnet 1123, winding bridge magnet 1123, minus. When bridge magnet 1123 is operated, the second digit 3 is indicated in the corresponding multiple contact group.

The register is now ready to receive the third digit, which as well as the succeeding subscriber's digits and designation ciphers for marking of the respective intermediate relay sets, is received in similar manner as the previously transmitted digits and ciphers.

When the first digit has been received by the register REM', the impulse transmission at the exchange B is started for communicating the subscriber 13001.

The transmission takes place in normal manner characteristic for the telephone system of exchange B, in this case straight forward impulses of the same kind as digit impulses having been chosen. The transmission thus takes place by means of interrupting relays 1007 and 1008 and connecting relays 1012—1021 and is controlled by the correspondingly closed multiple contact group associated with the respective bridge magnet 1122—1128.

When the register obtained connection to the register selector relay 1023 was operated over the following circuit: Plus, contact 1—2 relay 1030, contact 3—4 relay 1011, contact 1—2 relay 1022, contact 6—7 relay 1023, winding relay 1023, minus. Upon connection of the register to the register selector, a group selector or cord circuit is called at the exchange B over the following loop circuit: Plus, one branch $a'$ of the cord circuit, contact 1—2 relay 1404, contact 11—12 in the multiple of the register selector, contact 7—8 relay 1001, contact 5—6 relay 1007, winding relay 1006, contact 10—11 relay 1001, multiple contact 9—10 of the register selector, contact 4—5 relay 404, the other branch B' of the cord circuit.

By opening and closing this circuit by means of contact 5—6 relay 1007, a group selector or a register at the local exchange of the called subscriber can be operated by a subscriber in known manner. When the first bridge magnet 1122 now operates and marks the first digit, it closes its contact 13—14. The transmission of impulses over the loop circuit is then started by interrupting the loop of the cord circuit upon actuation of relay 1007 (the first impulse starts). Relay 1007 is energised over the following circuit: Plus, contact 13 of bridge magnet 1122, contact 2—3 relay 1023, contact 1—2 relays 1023—1029, contact 1—2 relay 1011, contact 3—4 relay 1008, winding relay 1007, minus. When closing contact 7—8 relay 1007, the first control relay 1012 is operated over the following circuit: Plus, contact 7—8 relay 1007, contact 1—2 relay 1010, contact 21—22 relay 1012, minus.

Relay 1008 is operated over the following circuit: Plus, contact 13—14 bridge magnet 1122, contact 2—3 relay 1023, contact 1—2 relay 1023—1029, contact 1—2 relay 1011, contact 3—4 relay 1007, winding 1008, minus.

Relay 1007 is now deenergised by opening of contact 3—4 relay 1008, when said relay is operated (end of first impulse). Relay 1010 is then operated, which heretofore has been short-circuited by contact 9—10 of relay 1007 over the following circuit: Plus, contact 3—4 relay 1002, contact 7—8 relay 1011, winding relay 1010, contact 22—23 relay 1013, contact 22—23 relay 1012, winding relay 1012, minus. Relay 1008 is deenergised, when relay 1007 is deenergised and its contact 3—4 is opened. Relay 1007 then receives operating current again (the second impulse starts) and operates. Its contact 7—8 is then closed again, whereby relay 1013 is operated over the following circuit: Plus, contact 7—8 relay 1007, contact 2—3 relay 1010, contact 19—20 relay 1012, contact 18—19 relay 1013, winding relay 1013, minus. Relay 1013 now controls by its contact 14—15, if the digit, which is being transmitted, really is 1.

If this was the case, and thus the impulse operation of the first digit should terminate, relay 1011 operates over the following circuit: Minus, contact 15—16 of the actuated multiple contact group of the select magnet 1112, contact 14—15 relay 1013, contact 13—14 relay 1014—1021, winding 1011, plus. In this manner any further transmission of impulses for this digit is stopped. By opening of contacts 7—8 of relay 1011, relays 1010, 1012—1013 are deenergised, and when contact 5—6 of relay 1011 is opened, the shortcircuit of relay 1022 ceases, which relay then operates in series with relay 1023, winding relay 1022, contact 10—11 relay 1024, contact 7—8 relay 1023, winding relay 1023, minus.

When relay 1013 deenergised, relay 1011 is also deenergised after a slow action of about 500 milliseconds, when contact 14—15 of relay 1013 is opened. When contact 3—4 of relay 1011 is closed, relay 1024 is energised over the following circuit: Plus, contact 1—2 relay 1030, contact 3—4 relay 1011, contact 2—3 relay 1022, contact 4—5 relay 1023, contact 6—7 relay 1024, winding relay 1024, minus. When contact 1—2 relay 1011 is closed, the transmission of impulses for the second digit is started, and takes place in similar manner as for the first digit. The following digits are thereafter transmitted in similar manner.

When the correct number of impulses for the last digit has been transmitted, relay 1011 is operated in similar manner as previously has been described. By interruption of contact 7—8 of relay 1011 the operated relay 1013 is deenergised. Said digit was assumed to be 1. Relay 1011 is now deenergised, when contact 14—15 of relay 1013 was opened. When contact 3—4 of relay 1011 is closed, relay 1029 is energised over the following circuit: Plus, contact 1—2 relay 1030, contact 3—4 relay 1011, contact 1—2 relay 1022, 4—5 relay 1028 (not shown), contact 4—5 relay 1029, winding relay 1029, minus. Relay 1001 is now energised over contact 12—13 relay 1029, whereby the current direction indicating relay 1003 is connected to the circuit towards the called subscriber.

We expect that the exchange, to which the called subscriber is connected, is constructed in such a manner, that the polarity of the talking branches is reversed, when the subscriber answers. The marking of the answer of the called subscriber, can, however, be made in any other manner.

The current indicating relay does not energise for the prevailing direction of current, before the called subscriber answers. We now assume that the subscriber in the usual manner has been called by the signalling equipment at the B-exchange, and that he has answered the call. The polarity of the talking branches is now reversed, whereby relay 1003 is operated.

When its contact 3—4 has been closed, the intermediate selector is started for seeking an idle relay repeating set for communication to the exchange A over the following circuit: Plus, contact 1—2 relay 1005, contact 3—4 relay 1003, contact 1—2 in the multiple contact group of the bridge magnet 1535, winding of relay 1405 of the register selector, its contact 10—11, contact 5—6 relay 1301, contact 7—8 relay 1331, plus. Relay 1405 is then energised. Relay 1301 is now energised over contact 9—10 relay 1405, in series with relay 1405, whereby seeking of an idle outgoing relay repeating set is started in a manner similar to that which has hereinbefore been described for transfer of digits from exchange A to exchange B.

When the bridge magnet 1332 operates, the $a$- and $b$-branches of the relay repeating set are connected to the outgoing $a$- and $b$-branches of the receiving register REM' over the following circuit: Plus, winding I of relay 1209, contact 5—6 relay 1208, winding relay 1207, contact 1—2 relay 1205, contact 1—2 relay 1202, contact 11—12 of the multiple contact group of the bridge magnet 1332 corresponding to select magnet 1302, contact 7—8 in the multiple contact group of bridge magnet 1535 corresponding to select magnet 1534, contact 2—3 relay 1001, contact 5—6 relay 1007, winding relay 1006, contact 5—6 relay 1001, contact 5—6 of the multiple contact groups of the crossbar switch of the register selector, contact 9—10 in the actuated multiple contact group of the crossbar switch of the intermediate selector, contact 4—5 relay 1202, contact 1—2 relay 1204, winding relay 1206, contact 8—9 relay 1208, winding II relay 609, minus.

Relay 1207 now operates, whereby a positive current pulse, in similar manner as previously has been described, is transmitted to exchange A, actuating relay 610, which closes its contact 1—2. Relay 605 now operates, closing its contact 4—5. The intermediate selector at exchange A is now connected, as previously described. When relay 600 is energised, a positive current pulse is transmitted from exchange A to exchange B, as previously described. At exchange B relays 1205, 1203, 1202 will operate as previously described, whereby direction of current will be reversed over the talking branches towards REM'.

The current direction indicating relay 1006 is then operated and relay 1005 is also operated over contact 1—2 of relay 1006. When contact 1—2 of relay 1005 is interrupted, the common part of the intermediate selector MV' at exchange B is released. When contact 1—2 of relay 1003 is closed, a special tone is transmitted to the called subscriber, or a talking machine transmits a message that a call is coming, for example, "Long distance call is arriving." The register REM' now re-transmits the special indication ciphers previously received from the register RES, and which indicates which intermediate relay set at exchange A had been used for setting up the call, and to which the calling subscriber is still connected. These special indication ciphers are now transmitted to the corresponding part of the intermediate selector at exchange A.

The transmitter sends these indication ciphers by the aid of a rapid code in the same manner as when the subscriber's digits were transmitted from the register RES to REM'. The indication ciphers were here assumed to be the same as for the cipher 1, that is, two plus potentials supplied to the branches of the outgoing relay repeating set, which cipher is transformed into two positive current pulses transmitted over the line circuit to the receiving exchange. The transmission of the ciphers takes place by the aid of the impulse transmitting relays 1007—1008 and the controlling relays 1012—1014.

When contact 3—4 of relay 1005 is closed, the transmission of impulses is started by operation of relay 1007 in similar manner as previously has been described. Relay 1012 is operated, when contact 7—8 of relay 1007 is closed.

When contact 11—12 of relay 1012 is closed, minus potential is connected to the *b*-branch to the relay repeating set over the following circuit: Minus, contact 3—4 of the multiple contact group of bridge magnet 1128, contact 10—11 relay 1013, contact 11—12 relay 1012, *b*-branch to the relay repeating set, contact 5—6 relay 1202, winding I of relay 1209, plus, whereby in known manner a positive current pulse is transmitted to exchange A. Upon closing of contact 3—4, relay 1007, relay 1008 is energised and opens its contact 3—4. Relay 1007 is then deenergised. When relay 1008 is deenergised and relay 1007 thereafter operates again, relay 1013 is energised.

Relay 1009 is now energised over the following circuit: Minus, contact 3—4 in the actuated multiple contact group of bridge magnet 1128, contact 11—12 relay 1013, winding 1009, plus. Relay 1009 now connects minus potential over its contact 3—4 to the relay repeating set, whereby the differential relay 1209 operates again. Relay 1008 is now energised again over contact 3—4 relay 1007. After a while relay 1007 is deenergised, and relay 1011 is energised over the following circuit: Minus, contact 1—2 relay 1007, contact 1—2 relay 1008, contact 1—2 relay 1009, winding relay 1011, plus.

When the combination has been transmitted to exchange A, a negative current pulse is transmitted as previously mentioned from exchange A, which is transferred to the receiving register in the form of a reversion of the polarities over the line branches. Relay 1006 is then energised. When its contact 3—4 is opened, relay 1030 looses its holding current and is deenergised. When contact 7—8 relay 1030 is opened, the current to the bridge magnet of the register selector is deenergised, whereby the called subscriber is coupled to the outgoing relay repeating set REP' and thus to the calling subscriber at exchange A.

We will now observe the switching procedure at exchange A from the moment, when the special ciphers corresponding to the intermediate relay set are transmitted from the receiving register REM' at exchange B, at which exchange re-connection of the call is expected.

When the positive current pulse, which starts the re-connection, is received at exchange A, relay 610 of the relay repeating set is deenergised and closes its contact 1—2. Relay 605 is energised and also relay 603, which receives operating current over contact 4—5 relay 605. Relay 600 is energised over contact 1—2 relay 603, as previously described. The common part of the intermediate selector is now connected over contacts 4—5 and 6—7 of relay 600. When relay 600 is energised over its contact 2—3 a positive current pulse is transmitted to exchange B. The ciphers which determine the corresponding intermediate relay set can now be received by the intermediate selector MV.

The ciphers in this example consist of two successive positive current pulses. When the first positive current pulse reaches exchange A, relay 610 is energised, closing its contact 1—2, whereby relay 605 is energised. This relay now closes its contact 2—3, whereby the *a*-branch to the receiving part of the intermediate selector is connected to plus potential in a manner previously described. Relay 530 and 528 are then energised, which latter relay closes its contact marked *a''*. Upon operation of relay 530, relay 529 is energised over contact 3—4 relay 530. At termination of the positive current pulse, and when the plus potential of the *a*-branch ceases, relay 530 is deenergised, whereby relay 528, which earlier received weak current in series with the resistance M, now receives strong current and also closes its contact marked *b''*. When the second positive current pulse is received at exchange A, relay 610 closes its contact 1—2 anew, whereby relay 605 is energised. The *a*-branch to the intermediate selector MV receives plus potential anew, whereby relays 526 and 530 are operated over the following circuit: Plus, contact 1—2 relay 608, contact 2—3 relay 605, contact 1—2 relay 602, contact 4—5 relay 600, relay 530, contact 3—4 relay 528, contact 4—5 relay 526, relay 526, minus. When relay 526 is energised, it interrupts at its contact 7—8 the current to relay 528, which is deenergised. After a short while, about 100 milliseconds, the slow acting relay 529 is deenergised. The select magnet, which corresponds to the intermediate circuit, to which the A-subscriber is connected, now receives current and is operated over the following circuit: Plus, contact 3—4 relay 529, contact 13—14 relay 526, contact 9—10 relay 525, select magnet 502, minus. The bridge magnet 532, corresponding to the relay repeating set, now operates over the following circuit: Plus, contact 1—2 relay 529, 1—2 relay 526, 14—15 select magnet 502, contact 8—9 relay 600 of the relay repeating set, winding bridge magnet 532, minus. The talking branches are now extended between the outgoing relay repeating set REP and the intermediate relay set MR, when the multiple group contacts 9—10 and 11—12 of the select magnet 502 are closed. Relay 401 then operates over contacts 3—4 of bridge magnet 532. The talking circuit is now ready, and the conversation can begin. When contact 1—2 of bridge magnet 532 is opened, relay 600 is deenergised and a negative current pulse is transmitted to exchange B. The common part of the intermediate selector MV, the relays 512—531 are now restored to normal.

Each select magnet in MV corresponds to an intermediate relay set MR and each bridge in the crossbar switch corresponds to a relay repeating set REP, whereby relays 512—531 are common, so that only one call can be set up at a time.

When the talking branches were connected through, and relays 606—607 were connected towards local exchange A, relays 606 and 607 were energized in a loop over a cord circuit or a group selector at the exchange A. Hereby a positive current pulse was transmitted to exchange B.

If this positive current pulse should not be transmitted at once after the negative current pulse, which is received, when the relay repeating set is connected through to the intermediate relay set at exchange B (the subscriber at exchange A has, for example, put his receiver on its hook), this may cause the intermediate relay set at exchange B to transmit a message to the called subscriber over a talking machine: "Call cancelled," whereafter the long distance line between exchanges A and B is disconnected.

The receiving register REM' may be so arranged that, if busy tone is received from the called subscriber, a signal is transmitted to the intermediate selector at exchange A, which causes the intermediate relay repeating set in known manner to be connected to a busy tone circuit at exchange A, whereafter the line is disconnected.

Other embodiments can also be arranged, without departing from the inventive idea.

Having now particularly described and ascertained the nature of our said invention and in what manner the same is to be performed, we declare that what we claim is:

1. In a telecommunication system, two exchanges, a plurality of subscribers' lines connected to each exchange, subscribers' stations connected to said lines; a plurality of trunklines provided between said exchanges, means including said trunklines for connecting any calling station of one exchange with any station of the other exchange, the calling exchange comprising a plurality of switching circuits, means including said switching circuits, for connecting a calling station to an idle trunkline, and means for transmitting signal combinations corresponding to the called subscriber's station and signals for identification of the switching circuit connected to the calling station over said idle trunkline, means at the called exchange for receiving said signal combinations, and means for storing said signal combinations, means at both exchanges to cause disconnection of the trunkline over which the signal combinations have been transmitted as soon as said signal combinations have been received at the called exchange, means at the calling exchange whereby said disconnect means is actuated as soon as said signals have been transmitted, and means at the called exchange whereby said disconnect means is actuated as soon as said signals have been received, means at the called exchange for selecting the desired subscriber's number according to the received signal combinations, means at the called exchange for selecting an idle trunkline leading to the calling exchange, when the called subscriber's station has answered the call, means to cause the subscriber's answer signal to actuate the said selecting means, and means at the called exchange for transmitting the received stored signal combinations back to the calling exchange over the last mentioned selected trunk line, means at the calling exchange for receiving the said signal combination transmitted back to the calling exchange and corresponding to the switching circuit and to the calling subscriber's station connected thereto, and means for connecting the last mentioned selected trunk line to said calling switching circuit for finally establishing connection between the two subscribers' stations.

2. A system as claimed in claim 1, in which each exchange comprises auxiliary selectors coupled between said switching circuits, to which said receiving, storing and transmitting means are coupled, and the trunk lines, said selectors including means whereby said auxiliary selectors are adapted for non-numerical selection of an idle outgoing trunk line, and means for numerical selection of a marked switching circuit over an incoming trunk line selected at the called exchange for finally establishing through-connection between the said two subscribers' stations.

3. A system as claimed in claim 1, in which each exchange comprises group selectors coupled between said switching circuits, to which said receiving, storing and transmitting means are coupled, and the subscribers' lines said group selectors including means whereby said group selectors are adapted for non-numerical selection of an idle switching circuit for connection to an idle outgoing trunk line, and means for numerical selection of a called subscriber's station according to stored signal combinations in the storing means.

4. A system as claimed in claim 1, in which each exchange comprises auxiliary selectors connected between said switching circuits, to which said receiving, storing and transmitting means are connected, and the trunk lines, said auxiliary selectors at the called exchange comprising means for transmitting a busy signal to the calling exchange and to the calling subscriber, should the called subscriber's station be busy.

PER HARRY ELIAS CLAESSON.
IVAN WITALIS GRUNDIN.

REFERENCES CITED

The following references are of record in the file of this patent:

UNITED STATES PATENTS

| Number | Name | Date |
|---|---|---|
| 1,851,482 | Baker | Mar. 29, 1932 |
| 2,252,856 | Lubberger | Aug. 19, 1941 |
| 2,306,087 | Soffel | Dec. 22, 1942 |
| 2,438,496 | Deakin | Mar. 30, 1948 |